United States Patent
Kadono

[19]
[11] Patent Number: 6,078,695
[45] Date of Patent: Jun. 20, 2000

[54] SHAPE CODING METHOD AND SHAPE DECODING METHOD

[75] Inventor: Shinya Kadono, Kobeshi, Japan

[73] Assignee: Matsushita Electric Industrial Co., Ltd., Japan

[21] Appl. No.: 09/095,604

[22] Filed: Jun. 11, 1998

[30] Foreign Application Priority Data

Jun. 13, 1997 [JP] Japan .................................. 9-157135

[51] Int. Cl.⁷ ...................................................... G06K 9/00
[52] U.S. Cl. .......................................... 382/243; 382/239
[58] Field of Search .................................. 382/232, 233, 382/234, 235, 236, 237, 238, 239, 240, 241, 242, 243, 244, 245, 246, 247, 248, 249, 250, 251, 252, 253; 348/402, 416, 699, 420; 358/448, 433, 458, 429; 704/222, 208, 214, 223, 227, 258; 340/825.3

[56] References Cited

U.S. PATENT DOCUMENTS 5,608,458  3/1997  Chen et al. .............................. 348/413
5,886,742  3/1999  Hibi et al. .............................. 348/402

*Primary Examiner*—Bijan Tadayon
*Attorney, Agent, or Firm*—Parkhurst & Wendel, L.L.P.

[57] ABSTRACT

A shape coding method of coding an object shape signal indicating a prescribed object shape in an image display signal, includes coding the object shape signal for each unit region of a prescribed size on a display screen to generate a coded shape bit stream, and decoding a signal which is in the middle of the coding to generate a locally decoded shape signal; analyzing the locally decoded shape signal for each unit region, and deciding at least one of a type of shape post-processing of the locally decoded shape signal for making an object shape obtained from the locally decoded shape signal smooth and whether to perform the shape post-processing to the locally decoded shape signal, in accordance with an analysis result; and outputting one of the locally decoded shape signal to which prescribed shape post-processing has been performed and the locally decoded shape signal to which the shape post-processing has not been performed, as a coding shape signal for use in coding a signal other than the object shape signal in the image display signal.

24 Claims, 20 Drawing Sheets

Fig.3 (a)
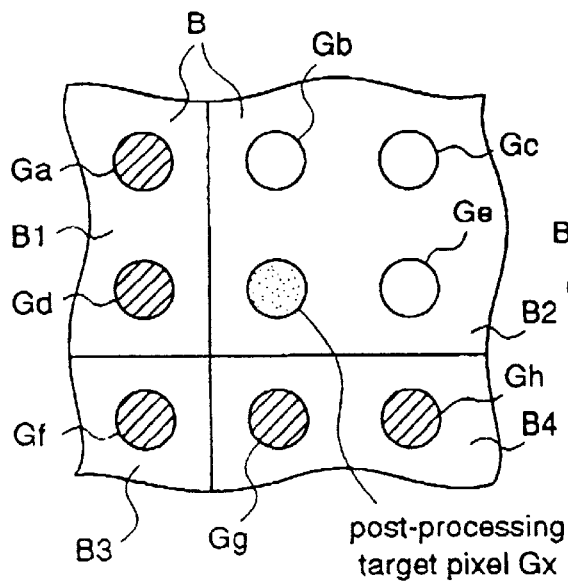
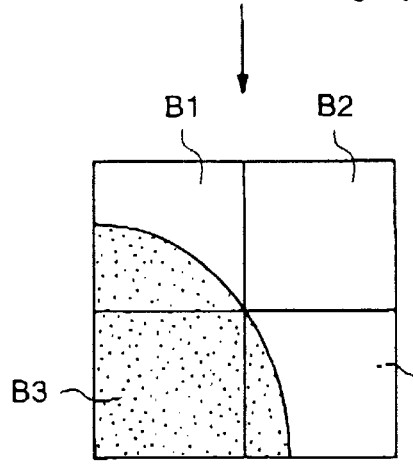
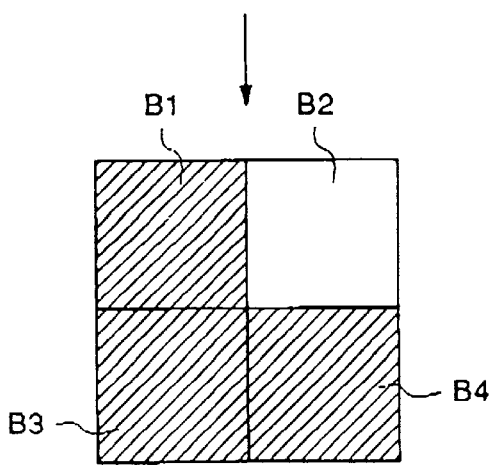
Fig.3 (b)
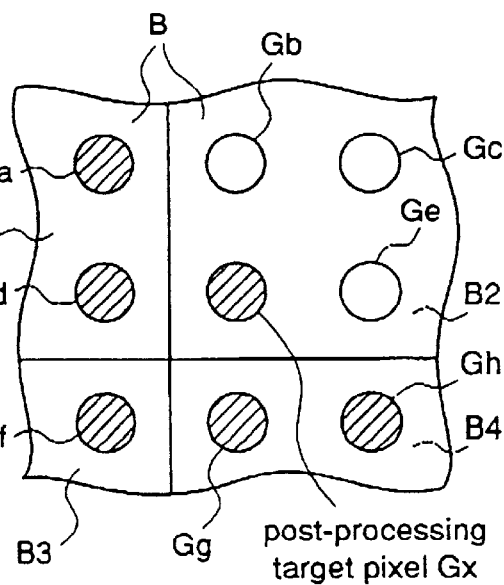
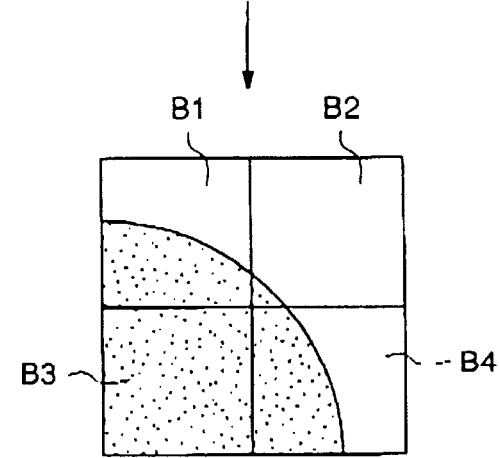
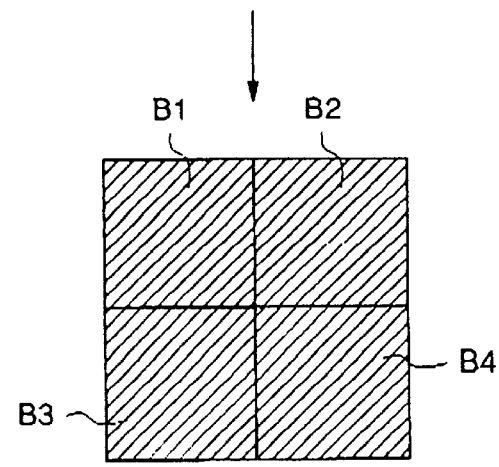

SHAPE CODING METHOD AND SHAPE DECODING METHOD

FIELD OF THE INVENTION

The present invention relates to a shape coding method, a shape coding apparatus, a shape decoding method, a shape decoding apparatus, and a data recording medium in which a program for implementing these methods or apparatus in software is stored and, more particularly to coding and decoding an object shape signal (a signal indicating a shape of an object) required for coding and decoding an image display signal for each object.

BACKGROUND OF THE INVENTION

In recent years, "multimedia" which handles audio, video, and other data integratively has been widely utilized. The multimedia is used to transmit information of conventional information media, namely, newspapers, magazines, television, radios, telephones, and so forth, to users. In general, in the multimedia, graphics, sound, images, and so forth, as well as characters, are related to each other simultaneously. It is essential that information of the conventional information media be in a digital format so that it is intended for the multimedia.

Information of each information media is given in terms of amount of digital information. For example, characters require information of 1~2 bytes per character, while audio requires information of 64 kbits (telephone quality) per second, and further, moving pictures require information of 100 Mbits or more (current television receiving quality) per second. So, with respect to the information medium of image information, its enormous amount of information cannot be handled in a digital format. For example, although visual telephones have already been put to practical use by means of an ISDN (Integrated Services Digital Network) which accommodates a transmission rate ranging from 64 kbps to 1.5 Mbps, video of a TV or a camera cannot be directly sent over the ISDN.

Accordingly, there is a need for a compression technique for information. In case of visual telephones, a moving picture compression technique according to H.261 standard which is internationally standardized by an ITO-T (International Telecommunication Union-Telecommunication Standardization Sector) is employed. Also, according to an information compression technique conforming to MPEG (Moving Picture Experts Group) 1 standard, audio and video information can be recorded in a normal CD (compact disc) for music.

The MPEG is an international standard for data compression of a moving picture. According to MPEG1, moving picture data is compressed into 1.5 Mbps data, that is, TV signal information is compressed into about 1/100 information. Since a transmission rate of the MPEG1 is restricted to about 1.5 Mbps, according to MPEG2 standardized to meet demands of a higher image quality, the moving picture data is compressed into 2 to 15 Mbps data.

In status quo, MPEG4 is being standardized by a group (ISO/IEC JTC1/SC29/WG11) which has standardized image information for each object on a display screen and required signal processing can be performed, and new capabilities needed for multimedia can be provided.

According to MPEG4, an object shape signal indicating a shape of an object, which is included in an image display signal of each object on a display screen, is coded, and then by referring to the resulting coded object shape signal (hereinafter referred to as a coded shape bit stream), a pixel value signal for color display of the object, which is included in the image display signal is coded.

While values of pixels located inside an object must be coded to display the object, values of pixels located outside the object need not be coded, since the image display signal is processed for each object on the display screen, and therefore information about pixels located outside the object is not necessary.

In MPEG4, therefore, pixel values located inside an object are coded by referring to an object shape, while pixel values outside the object are not, thereby reducing the number of coding bits to-be-coded.

FIGS. 15(a) and 15(b) are diagrams showing coding of a pixel value signal according to MPEG4. Suppose that pixel values of a fish-shaped object Ob displayed on a display screen R are coded herein. Shown in FIG. 15(a) are values of pixels of the object Ob for each macro block Mb, and an inside of the object Ob is represent by dots.

According to MPEG4, pixel values are coded for each unit region (macor block) Mb consisting of 16×16 pixels, i.e., for each of blocks into which a display screen R is divided, as in the case of MPEG1 and MPEG2, and therefore values of pixels in a macro block located completely outside the object need not be coded, whereas values of pixels in a macro block including at least a part of the object must be coded. Macro blocks to-be-coded of the object Ob in FIG. 15(a) are macro blocks Mbx represent by oblique lines in FIG. 15(b).

FIGS. 16(a)–16(c) are diagrams also showing the coding of pixel values according to MPEG4. These figures show the coding more specifically. Shown in FIG. 16(a) are pixel values of a brightness signal of pixels of the object Ob for each unit region (subblock) Sb consisting of 8×8 pixels, and in FIG. 16(b), an inside of the object is represented by dots.

According to MPEG, motion compensation of pixel values, or coding of coding mode indicating whether to perform intra coding or inter coding, is performed for each macroblock consisting of 16×16 pixels. To the brightness signal included in the pixel value signal for color display, DCT (Discrete Cosine Transform), quantization, and coding are performed for each subblock Sb consisting of 8×8 pixels, of 4 subblocks into which one macroblock is divided as shown in FIG. 16(a).

While pixel values of a brightness signal of pixels in a subblock Sb located completely outside an object need not be coded, pixel values of a brightness signal of pixels in a subblock Sb including at least a part of the object must be coded. Blocks to-be-coded of the object Ob shown in FIG. 16 (b) are subblocks Sbx represented by oblique lines in FIG. 16(c).

Thus, the numbers of macroblocks Mb and the subblocks Sb in which pixels values are to be coded depends on an object shape, and it is therefore important that the numbers be reduced.

Hereinafter, prior art coding and decoding according to MPEG4 will be described.

FIGS. 12(a) and 12(b) are diagrams showing prior art coding and decoding of an image display signal according to MPEG4, respectively. First, constructions of coding and decoding circuits will be described with reference to these figures.

Referring to FIG. 12(a), there is illustrated a coding circuit referred to herein by a reference numeral 200a, in which the image display signal is coded. The coding circuit 200a comprises a shape coding apparatus 210a for coding an object shape signal Sk indicating a shape of an object, which is included in the image display signal, and a pixel value coding apparatus 220a for coding a pixel value signal Sg with which the object is color-displayed.

The shape coding apparatus 210a comprises a shape coding unit 211a for performing shape coding including arithmetic coding to the object shape signal Sk to generate a coded shape signal Ck, and for performing local decoding (shape decoding) to the coded shape signal Ck to generate a locally decoded shape signal PEk, a shape post-processing unit 212 for performing shape post-processing to the locally decoded shape signal PEk so that an object to be displayed using the signal PEk has a smooth shape, and outputting a shape post-processed signal PFk, and a variable length coding unit 211b for performing variable length coding to the coded shape signal Ck to generate a coded shape bit stream Dk.

The shape coding unit 211a and the variable length coding unit 211b constitute a shape encoder 211. The shape postprocessor 212 corresponds to a noise elimination filter for pixel value coding, for example, a block distortion elimination filter or a mosquito distortion elimination filter.

The coding circuit 200a further comprises a pixel value coding unit 221a for performing DCT and quantization to a pixel value signal Sg included in the display signal on the basis of the shape post-processed signal PFk, to general a coded pixel value signal Cg, and a variable length coding unit 221b for performing variable length coding to the coded pixel value signal Cg to generate a coded pixel value bit stream Dg.

Referring to FIG. 12(b), there is illustrated a decoding circuit referred to herein by a reference numeral 200b, in which the image display signal which has been coded by the coding circuit 200a is decoded. The decoding circuit 210b comprises a shape decoding apparatus 210b for decoding the coded shape bit stream Dk to generate a decoded object shape signal Fk, and a pixel value decoding apparatus 220b for decoding the coded pixel value bit stream Dg on the basis of the decoded object shape signal Fk to generate a decoded pixel value signal Eg for color display of an object.

The shape decoding apparatus 210b comprises a variable length decoding unit 213a for performing variable length decoding to the coded shape bit stream Dk of the object shape signal to generate a variable length decoded shape signal C'k, a shape decoding unit 213b for performing shape coding including arithmetic decoding to the variable length decoded shape signal C'k, to generate a decoded shape signal Ek, and a shape post-processing unit 214 for performing shape post-processing to the decoded shape signal Ek so that an object to be displayed with the signal Ek has a smooth shape, and outputting a shape post-processed output signal as the decoded object shape signal Fk. The variable length decoding unit 213a and the shape decoding unit 213b constitute a shape decoder 213.

The decoding circuit 200b further comprises a variable length decoding unit 222a for performing variable length decoding to the coded pixel value bit stream Dg to generate a variable length decoded pixel value signal C'g, and a pixel value decoding unit 222b for performing inverse quantization and inverse DCT to the variable length decoded pixel value signal C'g to generate a decoded pixel value signal Eg.

Next, operation of the circuits 200a and 200b will be described.

FIG. 13 is a flowchart showing coding of an object shape signal in the prior art coding circuit. In the coding circuit 200a, the object shape signal Sk is coded by the shape coding apparatus 210a for each macro block.

In step S1, the object shape signal Sk is input to the shape coding apparatus 210a externally. In Step S2, the shape coding unit 211a performs shape coding including arithmetic coding to the object shape signal Sk, and outputs the coded shape signal Ck. In Step S3, the variable length coding unit 211b performs variable length coding to the coded shape signal Ck, and outputs the coded shape bit stream Dk. At this time, the shape coding unit 211a outputs the locally coded shape signal PEk in which the coded shape signal Ck has been locally decoded.

Subsequently in Step S4, the shape postprocessor 212 performs shape post-processing to the locally decoded shape signal PEk. Then in Step S5, the processor 212 outputs the shape post-processed signal PFk. After this shape post-processing, an object shape in which the object shape signal Sk has been coded does not show visual distortion in a display screen.

In the coding circuit 200a, the pixel value coding unit 221a performs DCT and quantization to the pixel value signal Sg on the basis of the shape post-processed signal PFk, and the variable length coding unit 221b performs variable length coding to the resulting coded pixel value signal Cg and outputs the coded pixel value bit stream Dg.

FIG. 14 is a flowchart showing decoding of the object shape signal in the prior art decoding circuit.

Initially, in the decoding circuit 200b, the shape decoding apparatus 210b performs decoding to the coded shape bit stream Dk.

In Step S11, the coded shape bit stream Dk is input to the shape decoding apparatus 210b. In Step S12, the variable length decoding unit 213a performs decoding to the bit stream Dk and outputs the variable length decoded shape signal C'k, and further, the shape decoding unit 213b performs shape decoding to the signal C'k and outputs the decoded shape signal Ek. In Step S13, the shape postprocessor 214 performs shape post-processing to the signal Ek. In Step S14, the shape postprocessor 214 outputs the shape post-processed signal Fk.

Shape post-processing in Step S13 and shape output operation in Step S14 are identical to those in Steps S4 and S5 of the prior art shape coding shown in FIG. 13, respectively.

Further, in the decoding circuit 200b, when the coded pixel value bit stream Dg is input to the pixel value decoding apparatus 220b, the variable length decoding unit 222a performs variable length decoding to the bit stream Dg and outputs the variable length decoded pixel value signal C'g. Then, the pixel value decoding unit 222b performs decoding to the pixel value signal C'g on the basis of the shape post-processed signal Fk from the shape postprocessor 214, and outputs the decoded pixel value signal Eg.

Since the shape post-processed signal PFk output from the shape postprocessor 212 matches the shape post-processed signal Fk output from the shape post processor 214, the pixel value signal can be coded and decoded correctly on the basis of the object shape signal.

In general, the locally decoded shape signal PEk of the object shape signal is referred to when coding the pixel value signal. This is because coding and decoding of the pixel value signal depend on an object shape, and the pixel value signal is decoded on the basis of the decoded object shape signal Ek.

A problem associated with the prior art coding of the image display signal is that the number of bits to-be-coded of the pixel value signal is increased.

FIG. 17(a)–17(c) are diagrams showing prior art shape post-processing. As in the case of FIGS. 15(a) and 15(b) and 16(a)–16(c), an inside of an object is represented by dots, and blocks in which pixel value signals are to-be-coded, are represented by oblique lines.

In description below, a macroblock Mb consisting of 16×16 pixels and a subblock Sb consisting of 8×8 pixels are both called "block B", since the same thing goes for them.

Shown in FIG. 17(a) is a part of an object shape obtained from the object shape signal to be displayed on a display region consisting of 4blocks B1 ~B4. Shown in FIG. 17(b) is a part of an object shape obtained from the locally decoded shape signal PEk and the decoded shape signal Ek to be displayed on a display region consisting of 4blocks B1~B4. Shown in FIG. 17(c) is a part of an object shape obtained from the shape post-processed signals PFk and Fk to be displayed on a display screen consisting of 4 blocks B1~B4.

As can be seen from FIGS. 17(a)–17(c), shape post-processing is important because it reduces visual distortion of the coded object shape signal. However, in some cases, the shape post-processing increases the number of blocks including the object shape.

More specifically, parts of upper right blocks B2 in FIGS. 17(a) and 17(b) which are located outside objects, are, after shape post-processing, located inside an object as shown in FIG. 17(c). Hence, coding pixel value signal of the block H2 becomes necessary. This increases the number of bits in coding a pixel value signal, causing degradation of efficiency in coding.

Hereinafter, a description is given of this shape-post-processing and a mechanism in which a block located outside an object region (hereinafter referred to as a block located outside an object) changes into a block including at least a part of an object region (hereinafter referred to as a block located inside an object) on a display screen, after the shape post-processing with reference to FIG. 18(a)–18(c). In the FIGS. 18(a)–18(c), a shape post-processing target pixel Gx is represented by dots and pixels located inside an object are represented by oblique lines.

In the shape post-processing, it is decided whether the pixel Gx is located inside or outside an object, by using the pixel Gx and pixels Ga~Gh located around the pixel Gx. As shown in FIG. 18(a), the pixels Ga, Gb, Gc, Gd, Ge, Gf, Gg, and Gh are located upper left, above, upper right, left, right, lower right, below, and lower right, with respect to the pixel Gx, respectively. Assuming that a coordinate of the pixel Gx is (1, 1), locations of the respective pixels are indicated by coordinates X(0, 0), X(0, 1), X(0, 2), X(1, 0), X(1, 2), X(2, 0), X(2, 1), and X(2, 2).

In addition, in the shape post-processing, it is decided whether the pixel Gx is located inside or outside an object according to decision by majority, in which comparison is made between the number of pixels located inside an object and the number of pixels outside the object, with respect to the 9 pixels Ga~Gh.

For instance, in a case where the pixels Ga, Cd, Gf, Gg, and Gh are located inside an object, and the pixels Gx, Gb, Gc, and Ge are located outside the object as shown in FIG. 18(b), since pixels located inside an object are more than pixels outside the object (5 pixels are located inside and 4 pixels are located outside), the decision result is that the pixel Gx is a pixel located inside as shown in FIG. 19 (c).

That is, in a case where there are block boundaries between the pixel Gx and the pixel Gd located left, and between the pixel Gx and the pixel Gg located below, respectively, even if a block including the pixel Gx is a block located outside an object, shape post-processing of the object shape signal results in a block located inside an object.

SUMMARY OF THE INVENTION

It is an object of the present invention to provide a shape coding method, a shape coding apparatus, a shape decoding method, a shape decoding apparatus, and a data recording medium in which an increase in the number if bits in coding a pixel value signal is suppressed while reducing visual distortion caused by coding an object shape signal.

It is another object of the present invention to provide a shape coding method, a shape coding apparatus, a shape decoding method, a shape decoding apparatus, and a data recording medium wherein it is possible to perform shape coding to a shape signal included in an image signal of an object having an arbitrary shape concurrently with coding a value of a pixel value signal included in the image signal, and simultaneously possible to avoid degradation of an image due to coding distortion resulting from shape coding.

Other objects and advantages of the invention will become apparent from the detailed description that follows. The detailed description and specific embodiments described are provided only for illustration since various additions and modifications within the spirit and scope of the invention will be apparent to those skill in the art from the detailed description.

According to a first aspect of the present invention, a shape coding method of coding an object shape signal indicating a prescribed object shape in an image display signal, comprises coding the object shape signal for each unit region of a prescribed size on a display screen to generate a coded shape bit stream, and decoding a signal which is in the middle of the coding to generate a locally decoded shape signal; analyzing the locally decoded shape signal for each unit region, and deciding at least one of a type of shape post-processing of the locally decoded shape signal for making an object shape obtained form the locally decoded shape signal smooth and whether to perform the shape post-processing to the locally decoded shape signal, in accordance with an analysis result; and outputting one of the locally decoded shape signal to which prescribed shape post-processing has been performed and the locally decoded shape signal to which the shape post-processing has not been performed, as a coding shape signal for use in coding a signal other than the object shape signal in the image display signal.

Therefore, coding of a pixel value signal in a unit region located outside an object on a display screen is suppressed, whereby the number of bits in coding a pixel value can be saved without degrading an image quality of an object shape.

According to a second aspect of the present invention, in the shape coding method if the first aspect, the decision on the shape post-processing in accordance with the analysis result is, when a locally decoded shape signal of a unit region indicates that the unit region is located outside an object, performed so that the locally decoded shape signal to which the shape post processing has been performed indicates that the unit region is located outside the object.

Therefore, coding of a pixel value signal in a unit region located outside an object can be reliably avoided.

According to a third aspect of the present invention, in the shape coding method of the second aspect, in the shape post-processing, the locally decoded shape signal is changed using a filter of a prescribed characteristic so that the object shape obtained from the locally decoded shape signal becomes smooth shape.

Therefore, shape post-processing can be performed to the locally decoded shape signal with a simple construction.

According to a fourth aspect of the present invention, a shape coding method of coding an object shape signal indicating a prescribed object shape in an image display signal, comprises downsampling the object shape signal to generate a downsampled shape signal in which pixels to-be-coded have been reduced; coding the downsampled shape signal for each unit region of a prescribed size on a display screen to generate a coded shape bit stream and decoding a signal which is in the middle of the coding to generate a locally decoded shape signal; upsampling the locally decoded shape signal to generate an upsampled shape signal in which pixels have been increased; analyzing the upsampled shape signal for each unit region, and deciding at least one of a type of shape post-processing of the upsampled shape signal for making an object shape obtained from the upsampled shape signal smooth and whether to perform the shape post-processing to the upsampled shape signal, in accordance with an analysis result; and outputting one of the upsampled shape signal to which presrived shape post-processing has been performed and the upsampled shape signal to which the shape post-processing has not been performed, as a coding shape signal for use in coding a signal other than the object shape signal in the image display signal. Therefore, the number of bits of the coded shape bit stream can be reduced, and further, the number of bits in coding a pixel value can be saved.

According to a fifth embodiment of the present invention, a shape decoding method of decoding a coded shape bit stream of a prescribed object shape in an image display signal to generate a decoded object shape signal of the object shape, comprises decoding the coded shape bit stream for each unit region of a prescribed size on a display screen to generate a decoded shape signal; analyzing the decoded shape signal for each unit region, and deciding at least one of a type of shape post-processing of the decoded shape signal for making an object shape obtained form the decoded shape signal smooth and whether to perform the shape post-processing to the decoded shape signal in accordance with an analysis result; and outputting one of the decoded shape signal to which prescribed shape post-processing has been performed and the decoded shape signal to which the shape post-processing has not been performed, as a decoding object shape signal (a decoding reference signal) for use in decoding a signal other than the object shape signal in the image display signal. Therefore, a pixel value signal can be correctly decoded by the use of the decoding reference signal while suppressing the number of bits in coding a pixel value.

According to a sixth aspect of the present invention, in the shape decoding method of the fifth aspect, the decision on the shape post-processing in accordance with the analysis result is, when a decoded shape signal of a unit region indicates that the unit region is located outside an object, performed so that the decoded shape signal to which the shape post-processing has been performed indicates the unit region is located outside the object. Therefore, decoding of a pixel value signal in a unit region located outside an object can be reliably avoided.

According to a seventh aspect of the present invention, in the shape decoding method of claim 6, in the shape post-processing, the decoded shape signal is changed using a filter of a prescribed characteristic so that the object shape obtained from the decoded shape signal becomes smooth.

Therefore, shape post-processing can be performed to the locally decoded shape signal with a simple construction.

According to an eighth aspect of the present invention, a shape decoding method of decoding a coded shape bit stream of a prescribed object shape in an image display signal to generate a decoded object shape signal of the object shape, comprises decoding the coded shape bit stream for each unit region of a prescribed size on a display screen to generate a decoded shape signal; upsampling the decoded shape signal to generate an upsampled shape signal in which pixels have been increased; analyzing the upsampled shape signal for each unit region, and deciding at least one of a type of shape post-processing of the upsampled shape signal for making an object shape obtained from the upsampled shape signal smooth and whether to perform the shape post-processing to the upsampled shape signal, in accordance with an analysis result; and outputting one of the upsampled shape signal to which prescribed shape post-processing has been performed and the upsampled shape signal to which the shape post-processing has not been performed, as a decoding object shape signal (a decoding reference signal) for use in decoding a signal other than the object shape signal in the image display signal.

Therefore, the number of bits of the coded shape bit stream can be reduced, and further, the number of bits in decoding a pixel value can be saved.

According to a ninth aspect of the present invention, a shape coding apparatus for coding an object shape signal indicating a prescribed object shape in an image display signal, comprises shape coding means for coding the object shape signal for each unit region of a prescribed size on a display screen to generate a coded shape bit stream, and decoding a signal which is in the middle of the coding to generate a locally decoded shape signal; shape analyzing means for analyzing the locally decoded shape signal for each unit region, and deciding at least one of a type of shape post-processing of the locally decoded shape signal for making an object shape obtained from the locally decoded shape signal smooth and whether to perform the shape post-processing to the locally decoded shape signal, in accordance with an analysis result; and shape post-processing means for performing prescribed shape post-processing to the locally decoded shape signal on the basis of an output of the shape analyzing means; and signal selecting means for one of the locally decoded shape signal from the shape coding means and the locally decoded shape signal to which shape post-processing means has been performed from the shape post-processing means, on the basis of the output of the shape analyzing means, an output of the signal selecting means serving as a coding shape signal for use in coding a signal other than the object shape signal in the image display signal.

Therefore, coding of a pixel value signal in a unit region located outside the object on a display screen is suppressed, whereby the number of bits in coding a pixel value can be saved without degrading an image quality of an object shape.

According to a tenth aspect of the present invention, a shape coding apparatus for coding an object shape signal indicating a prescribed object shape in an image display signal, comprises downsampling means for downsampling the object shape signal to generate a downsampled shape signal in which pixels to-be-coded have been reduced; shape coding means for coding the downsampled shape signal for each unit region of a prescribed size on a display screen to generate a coded shape bit stream, and decoding a signal which is in the middle of the coding to generate a locally decoded shape signal; upsampling means for upsampling the locally decoded shape signal to generate an upsampled shape signal in which pixels have been increased; shape analyzing means for analyzing the upsampled shape signal for each unit region, and deciding at least one of a type of shape post-processing of the upsampled shape signal for making an object shape obtained from the upsampled shape signal smooth and whether to perform the shape post-processing to the upsampled shape signal, in accordance with an analysis result; shape post-processing means for performing prescribed shape post-processing to the upsampled shape signal on the basis the analysis result; and signal selecting means for one of the upsampled shape signal from the upsampling means and the upsampled shape signal to which shape post-processing has been performed from the shape post-processing means, on the basis of the analysis result, an output of the signal selecting means serving as a coding shape signal for use in coding a signal other than the object shape signal in the image display signal.

Therefore, the number of bits of the coded shape bit stream can be reduced, and further, the number of bits in coding a pixel value can be saved, without degrading an image quality of an object shape.

According to an eleventh aspect of the present invention, a shape decoding apparatus for decoding a coded shape bit stream of a prescribed object shape in an image display signal to generate a decoded object shape signal of the object shape, comprises shape decoding means for decoding the coded shape bit stream for each unit region of a prescribed size on a display screen to generate a decoded shape signal; shape analyzing means for analyzing the decoded shape signal for each unit region, and deciding at least one of a type of shape post-processing of the decoded shape signal for making an object shape obtained from the decoded shape signal smooth and whether to perform the shape post-processing to the decoded shape signal, in accordance with an analysis result; shape post-processing means for performing prescribed shape post-processing to the decoded shape signal on the basis of the analysis result; and signal selecting means for one of the decoded shape signal from the shape decoding means and the decoded shape signal to which shape post-processing has been performed from the shape post-processing means, on the basis of the analysis result, an output of the signal selecting means serving as a decoding object shape signal (a decoding reference signal) for use in decoding a signal other than the object shape signal in the display shape signal.

Therefore, a pixel value signal can be correctly decoded by the use of the decoding reference signal while suppressing the number of bits in coding a pixel value.

According to a twelfth aspect of the present invention, a shape decoding apparatus for decoding a coded shape bit stream of a prescribed object shape in an image display signal to generate a decoded object shape signal of the object shape, comprises shape decoding means for decoding the coded shape bit stream for each unit region of a prescribed size on a display screen to generate a decoded shape signal; upsampling means for upsampling the decoded shape signal to generate an upsampled shape signal in which pixels have been increased; shape analyzing means for analyzing the upsampled shape signal for each unit region, and deciding at least one of a type of shape post-processing of the upsampled shape signal for making an object shape obtained from the upsampled shape signal smooth and whether to perform the shape post-processing to the upsampled shape signal, in accordance with an analysis result; shape post-processing means for performing prescribed shape post-processing to the upsampled shape signal on the basis of the analysis result; and signal selecting means for one of the upsampled shape signal from the upsampling means and the upsampled shape signal to which shape post-processing has been performed from the shape post-processing means, on the basis of the analysis result, an output of the signal selecting means serving as a decoding object shape signal for use in decoding a signal other than the object shape signal in the image display signal.

Therefore, the number of bits of the coded shape bit stream can be reduced, and further, the number of bits in decoding a pixel value can be saved.

According to a thirteenth aspect, a data recording medium in which a program for performing shape coding method of the first aspect executed by a computer is stored; and the program comprises coding the object shape signal for each unit region of a prescribed size on a display screen to generate a coded shape bit stream, and decoding a signal which is in the middle of the coding to generate a locally decoded shape signal; analyzing the locally decoded shape signal for each unit region, and deciding at least one of a type of shape post-processing of the locally decoded shape signal for making an object shape obtained from the locally decoded shape signal smooth and whether to perform the shape post-processing to the locally decoded shape signal, in accordance with an analysis result; and outputting one of the locally decoded shape signal to which prescribed shape post-processing has been performed and the locally decoded shape signal to which the shape post-processing has not been performed, as a coding shape signal for use in coding a signal other than the object shape signal in the image display signal.

Therefore, by loading the program into the computer, a coding method and a coding apparatus which reduce the number of bits in coding a pixel value are implemented without degrading an image quality of an object shape.

According to a fourteenth aspect of the present invention, a data recording medium in which a program for performing a shape decoding method of the fifth aspect executed by a computer is stored, comprises decoding the coded shape bit stream for each unit region of a prescribed size on a display screen to generate a decoded shape signal; analyzing the decoded shape signal for each unit region, and deciding at least one of a type of shape post-processing of the decoded shape signal for making an object shape obtained from the decoded shape signal smooth and whether to perform the shape post-processing to the decoded shape signal, in accordance with an analysis result; and outputting one of the decoded shape signal to which the shape post-processing has been performed and the decoded shape signal to which prescribed shape post-processing has not been performed, as a decoding object shape signal for use in decoding a signal other than the object shape signal in the image display signal.

Therefore, by loading the program into the computer, a decoding method and a decoding apparatus in which a pixel value signal can be decoded correctly by the use of the decoding object shape signal while suppressing the number of bits in coding a pixel value without degrading an image quality of an object shape.

According to a fifteenth aspect of the present invention, a shape coding method in which an object shape signal indicating a shape of an object which is included in an image display signal forming an image space including an object having an arbitrary shape is input and the input object shape signal is coded for each of unit regions of a prescribed size into which the image space is divided into, comprises performing plural types of compression and expansion with different compression ratios wherein an object shape signal in a unit region to be coded is compressed in a prescribed ratio to generate a compressed shape signal, and the compressed shape signal is expanded correspondingly to the compression to generate a locally decoded shape signal; analyzing locally decoded shape signals resulting from the compression and expansion with different compression ratios, thereby selecting compression and expansion with the highest compression ratio in which information included in the input object shape signal, indicating that the unit region to be coded is located outside the object is held in the locally decoded shape signal, among the plural types of compression and expansion; and coding a compressed shape signal resulting from the selected compression and expansion and outputting a coded shape signal.

Therefore, it is possible to perform shape coding to the shape signal concurrently with pixel value coding of the pixel value signal. Simultaneously, degradation of an image quality due to distortion resulting from shape coding is avoided.

For example, shape post-processing or the like avoids visual distortion of a regenerated image resulting from coding the object shape signal with improved efficiency, and significant degradation of an image quality resulting from shape post-processing is avoided.

According to a sixteenth aspect of the present invention, in the shape coding method of the fifteenth aspect, in each of the plural types of compression and expansion with different compression ratios, compression includes downsampling the object shape signal in a prescribed downsampling ratio, expansion includes upsampling the compressed shape signal correspondingly to the downsampling, and in the one selected compression and expansion, information included in the input object shape signal, indicating that the unit region to be coded is located outside the object is held in the locally decoded shape signal, regardless of coding distortion resulting from the downsampling and upsampling.

Therefore, compression and expansion of the object shape signal is carried out with simple construction.

According to a seventeenth aspect of the present invention, a shape coding method in which an object shape signal indicating a shape of an object which is included in an image display signal forming an image space including an object having and arbitrary shape is input and the input object shape signal is coded for each of unit regions of a prescribed size into which the image space is divided into, comprises performing plural types of compression and expansion with different compression ratios wherein an object shape signal in a unit region to be coded is compressed in a prescribed ratio to generate a compressed shape signal, and the compressed shape signal is expanded correspondingly to the compression to generate a locally decoded shape signal; analyzing locally decoded shape signals resulting from the compression and expansion with different compression ratios, thereby selecting compression and expansion with the highest compression ratio in which information included in the input object shape signal, indicating that the unit region to be coded is not located outside the object is held in the locally decoded shape signal, among the plural types of compression and expansion; and coding a compressed shape signal resulting from the selected compression and expansion and outputting a coded shape signal.

Therefore, between a block to-be-coded and a block to-be-decoded, mismatch in information indicating that these blocks are not located outside an object, is avoided while improving efficiency in coding. In addition, shape coding can be performed concurrently with pixel value coding with no degradation of an image quality due to coding distortion.

According to an eighteenth aspect of the present invention, in the shape coding method of the seventeenth aspect, in each of the plural types of compression and expansion with different compression ratios, compression includes downsampling the object shape signal in a prescribed downsampling ratio, expansion includes upsampling the compressed shape signal correspondingly to the downsampling, and in the one selected compression and expansion, information included in the input shape signal, indicating that the unit region to be coded is not located outside the object is held in the locally decoded shape signal, regardless of coding distortion resulting from the downsampling and upsampling.

Therefore, compression and expansion of the object shape signal is carried out with simple construction.

According to a nineteenth aspect of the present invention, a shape coding apparatus for receiving an object shape signal indicating a shape of an object which is included in an image display signal forming an image space including an object having an arbitrary shape as an input and coding the object shape signal for each of unit regions of a prescribed size into which the image space is divided into, comprises plural compression and expansion means for performing plural types of compression and expansion with different compression ratios wherein an object shape signal in a unit region to be coded is compressed in a prescribed ratio to generate a compressed shape signal, and the compressed shape signal is expanded correspondingly to the compression to generate a locally decoded shape signal; analyzing means for analyzing locally decoded shape signals output from the respective compression and expansion means with different compression ratios, thereby specifying compression and expansion means for performing compression and expansion with the highest ratio in which information included in the input object shape signal, indicating that the unit region to be coded is located outside the object is held in the locally decoded shape signal; signal selecting means for receiving an output of the analyzing means and selecting a compressed shape signal as an output of the compression and expansion means specified by the analyzing means among outputs of the plural compression and expansion means; and coding means for coding the compressed shape signal output from the compression and expansion means selected by the signal selecting means and outputting a coded shape signal.

Therefore, between a block to-be-coded and a block to-be-decoded, mismatch in information indicating that these blocks are located outside an object, is avoided while improving efficiency in coding. In addition, shape coding can be performed concurrently with pixel value coding with no degradation of an image quality due to coding distortion.

According to a twentieth aspect of the present invention, in the shape coding apparatus of the nineteenth aspect, the compression and expansion means performs downsampling to the object shape signal in a prescribed downsampling ratio as a part of the compression, and performs upsampling to the compressed shape signal correspondingly to the downsampling as a part of the expansion, and the analyzing means specifies compression and expansion means for performing compression and expansion in which information included in the input object shape signal, indicating that the unit region to be coded is located outside the object, is held in the locally decoded shape signal, regardless of coding distortion resulting from the downsampling and upsampling.

Therefore, compression and expansion of the object shape signal is carried out with simple construction.

According to a 21st aspect of the present invention, a shape coding apparatus for receiving an object shape signal indicating a shape of an object which is included in an image display signal forming an image space including an object having an arbitrary shape as an input and coding the object shape signal for each of unit regions of a prescribed size into which the image space is divided into, comprises plural compression and expansion means for performing plural types of compression and expansion with different compression ratios wherein an object shape signal in a unit region to be coded is compressed in a prescribed ratio to generate a compressed shape signal, and the compressed shape signal is expanded correspondingly to the compression to generate a locally decoded shape signal; analyzing means for analyzing locally decoded shape signals output from the respective compression and expansion means with difference compression ratios, thereby specifying compression and expansion means for performing compression and expansion with the highest ratio in which information included in the input object shape signal, indicating that the unit region to be coded is not located outside the object is held in the locally decoded shape signal; signal selecting means for receiving an output of the analyzing means and selecting a compressed shape signal as an output of the compression and expansion means specified by the analyzing means among outputs of the plural compression and expansion means; and coding means for coding the compressed shape signal from the compression and expansion means selected by the signal selecting means and outputting a coded shape signal.

Therefore, between a block to-be-coded and a block to-be-decoded, mismatch in information indicating that these blocks are not located outside an object, is avoided while improving efficiency in coding. In addition, significant degradation of an image quality of a regenerated image due to shape post-processing is avoided.

According to a 22nd aspect of the present invention, in the shape coding apparatus of the 21st aspect, the compression and expansion means performs downsampling to the object shape signal in a prescribed downsampling ratio as a part of the compression, and performs upsampling to the compressed shape signal correspondingly to the downsampling as a part of the expansion, and the analyzing means specifies compression and expansion means for performing compression and expansion in which information included in the input shape signal, indicating that the unit region to be coded is not located outside the object is held in the locally decoded shape signal, regardless of coding distortion resulting from the downsampling and upsampling.

Therefore, compression and expansion of the object shape signal is carried out with simple construction.

According to a 23rd aspect of the present invention, a data recording medium for storing a program executed by a computer, which performs shape coding method in which an object shape signal indicating a shape of an object which is included in an image display signal forming an image space including an object having an arbitrary shape is input and the input object shape signal is coded for each of unit regions of a prescribed size into which the image space is divided into, and the program comprises a first step for performing plural types of compression and expansion with different compression ratios wherein an object shape signal in a unit region to be coded is compressed in a prescribed ratio to generate a compressed shape signal, and the compressed shape signal is expanded correspondingly to the compression to generate a locally decoded shape signal; a second step for analyzing locally decoded shape signals resulting from the respective compression and expansion with different compression ratios, thereby selecting compression and expansion with the highest compression ratio in which information included in the input object shape signal, indicating that the unit region to be coded is located outside the object, is held in the locally decoded shape signal, among the plural types of compression and expansion; and a third step for coding a compressed shape signal resulting from the selected compression and expansion and outputting a coded shape signal.

Therefore, between a block to-be-coded and a block to-be-decoded, mismatch in information indicating that these blocks are located outside an object, is avoided while improving efficiency in coding. In addition, shape coding can be performed concurrently with pixel value coding with no degradation of an image quality due to coding distortion. This image coding is implemented by the computer.

According to a 24th aspect of the present invention, a data recording medium for storing a program executed by a computer, which performs shape coding method in which an object shape signal indicating a shape of an object which is included in an image display signal forming an image space including an object having an arbitrary shape is input and the input object shape signal is coded for each of unit regions of a prescribed size into which the image space is divided into, and the program comprises a first step for performing plural types of compression and expansion with different compression ratios wherein an object shape signal in a unit region to be coded is compressed in a prescribed ratio to generate a compressed shape signal, and the compressed shape signal is expanded correspondingly to the compression to generate a locally decoded shape signal; a second step for analyzing locally decoded shape signals resulting from the respective compression and expansion with different compression ratios, thereby selecting compression and expansion with the highest compression ratio in which information included in the input object shape signal, indicating that the unit region to be coded is not located outside the object is held in the locally decoded shape signal, among the plural types of compression and expansion; and a third step for coding a compressed shape signal resulting from the selected compression and expansion and outputting a coded shape signal.

Therefore, between a block to-be-coded and a block to-be-decoded, mismatch in information indicating that these blocks are not located outside an object, is avoided while improving efficiency in coding. In addition, shape coding can be performed concurrently with pixel value coding with no degradation of an image quality due to coding distortion. This image coding is implemented by the computer.

BRIEF DESCRIPTION OF THE DRAWINGS

FIGS. 3(a) and 3(b) are diagrams showing a case in which a block located outside an object is shape post-processed, and changed into a block located inside an object.

FIGS. 12(a) and 12(b) are diagrams showing a prior art processing system of an image signal according to MPEG4, wherein FIG. 12(a) shows a coding circuit and FIG. 12(b) shows a decoding circuit.

DETAILED DESCRIPTION OF THE PREFERRED EMBODIMENTS

Now, preferred embodiments of the present invention will be described with reference to FIGS. 1 to 11(a)–11(c).

Embodiment 1

Figure 1:
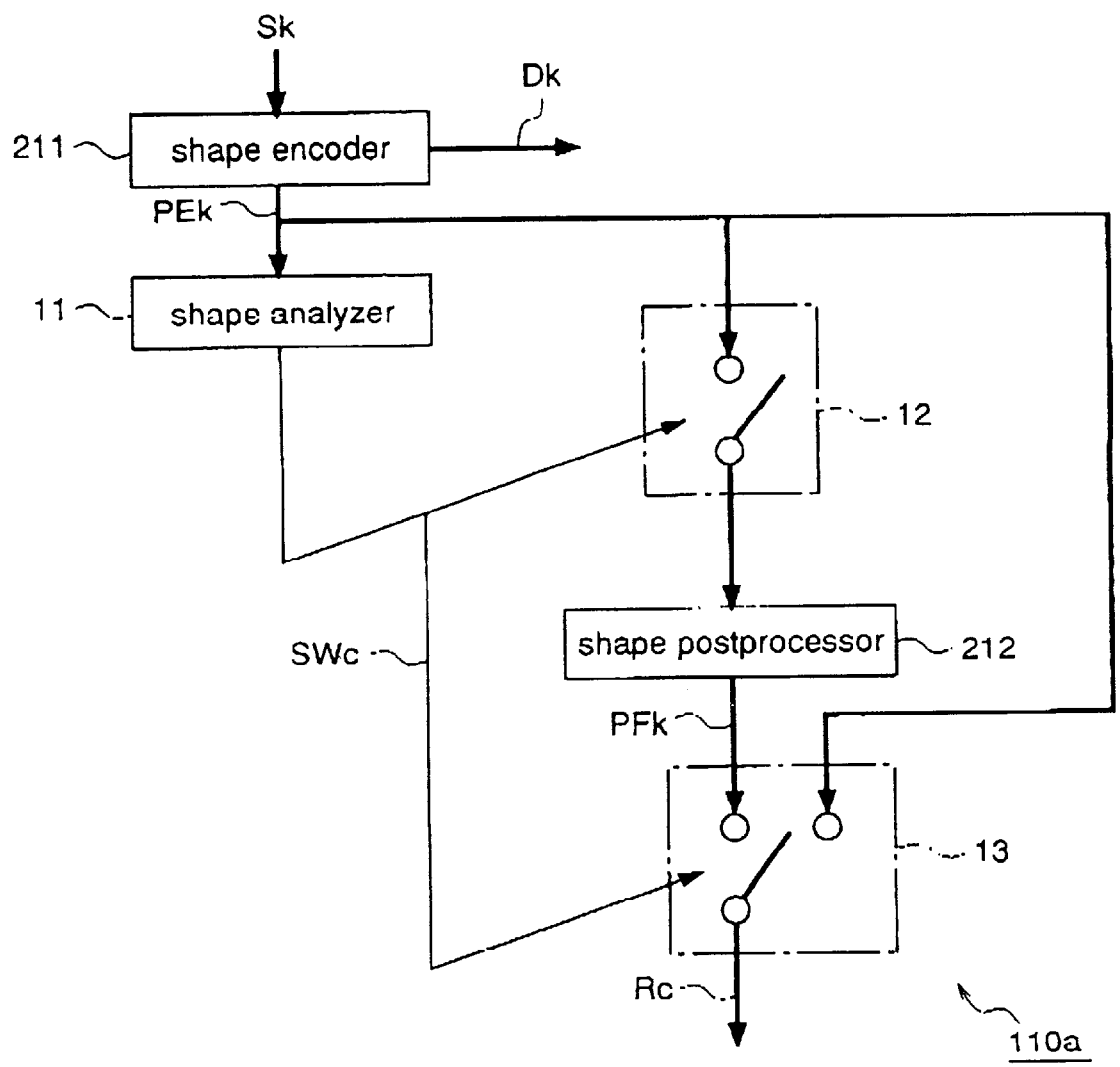
FIG. 1 is a block diagram showing a shape coding apparatus according to a first embodiment of the present invention.
Figure 2:
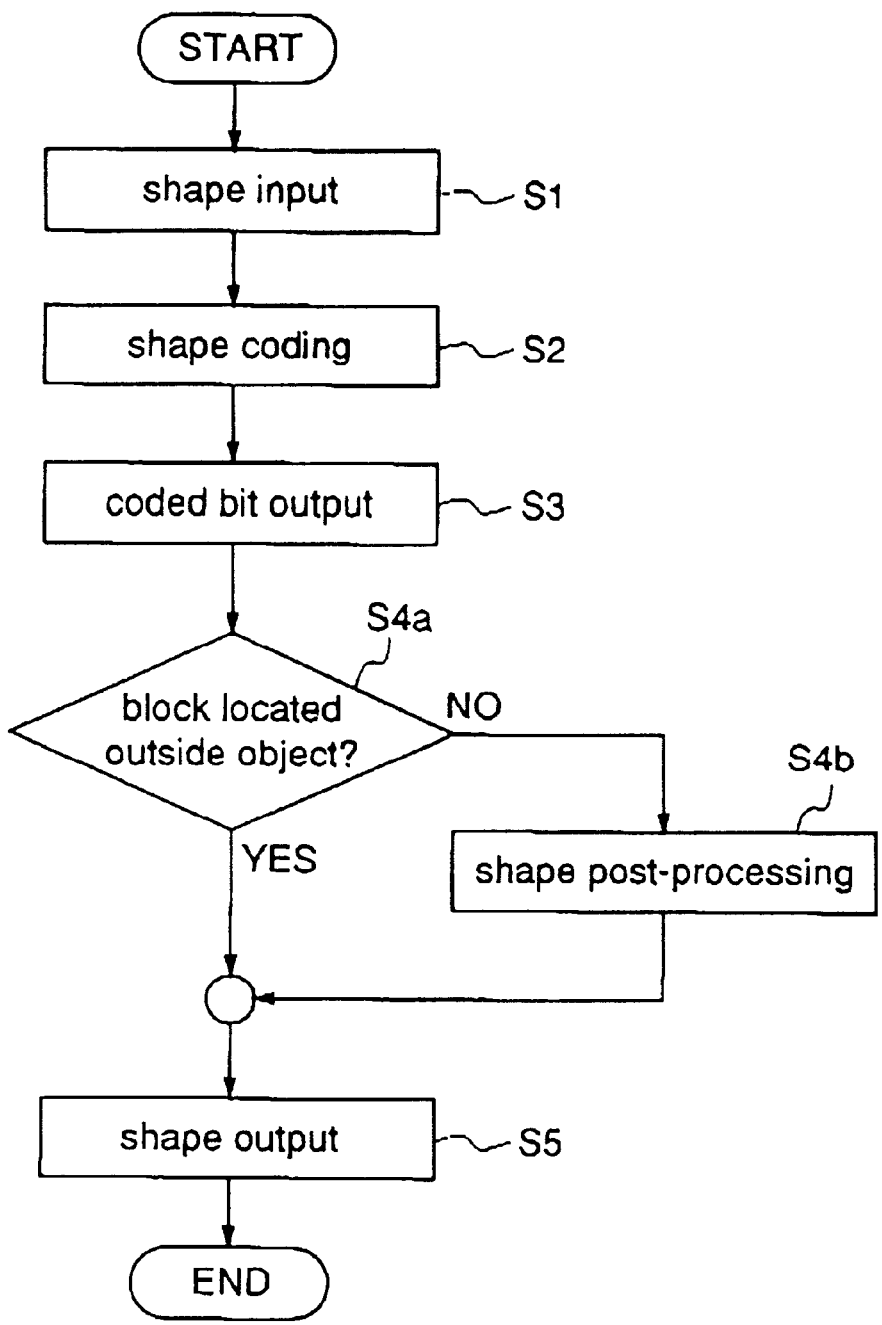
FIG. 2 is a flowchart showing coding in the shape coding apparatus of the first embodiment.
Figure 4:
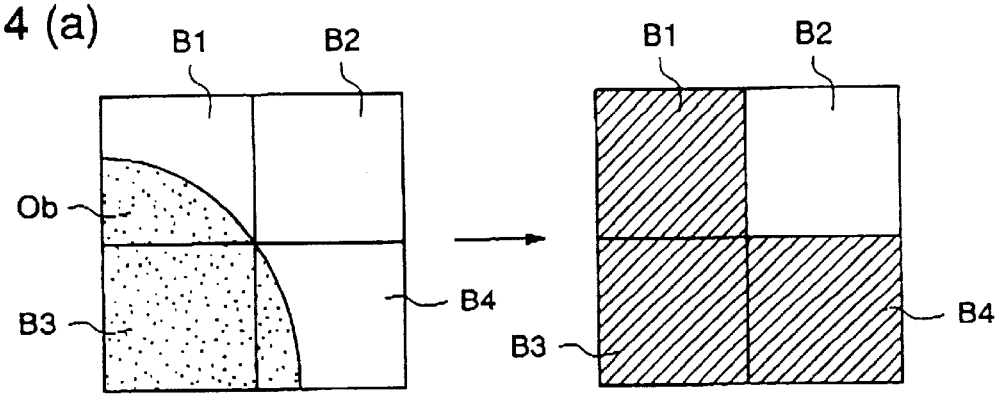
FIGS. 4(a)–4(c) are diagrams showing shape post-processing of the shape coding apparatus of the first embodiment.
Figure 4:
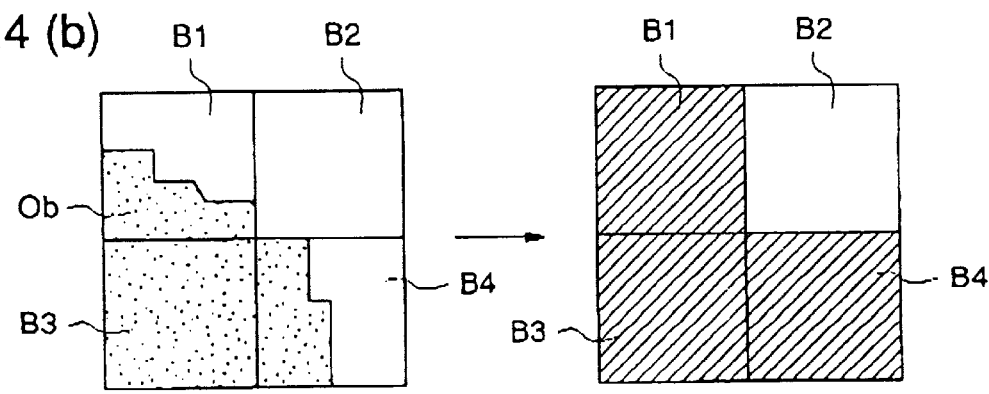
Figure 4:
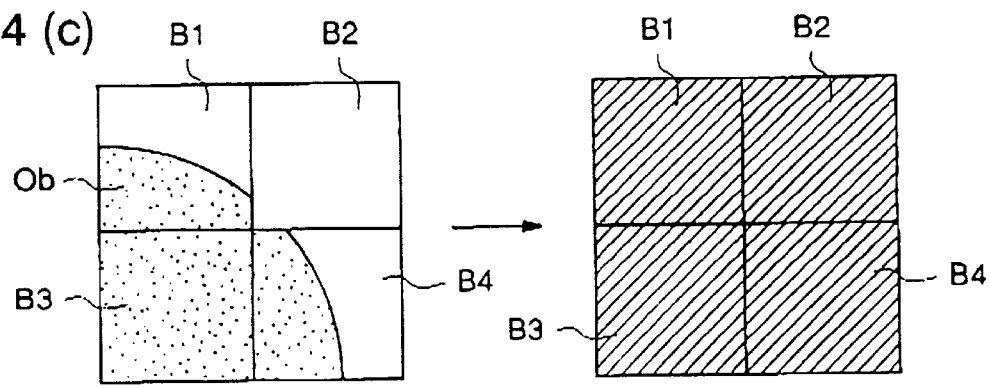

FIG. 1 is a block diagram showing a shape coding apparatus according to a first embodiment of the present invention and FIG. 2 is a flowchart showing coding of the shape coding apparatus. This first embodiment describes claims 1–3, and 9.

Figure 12:
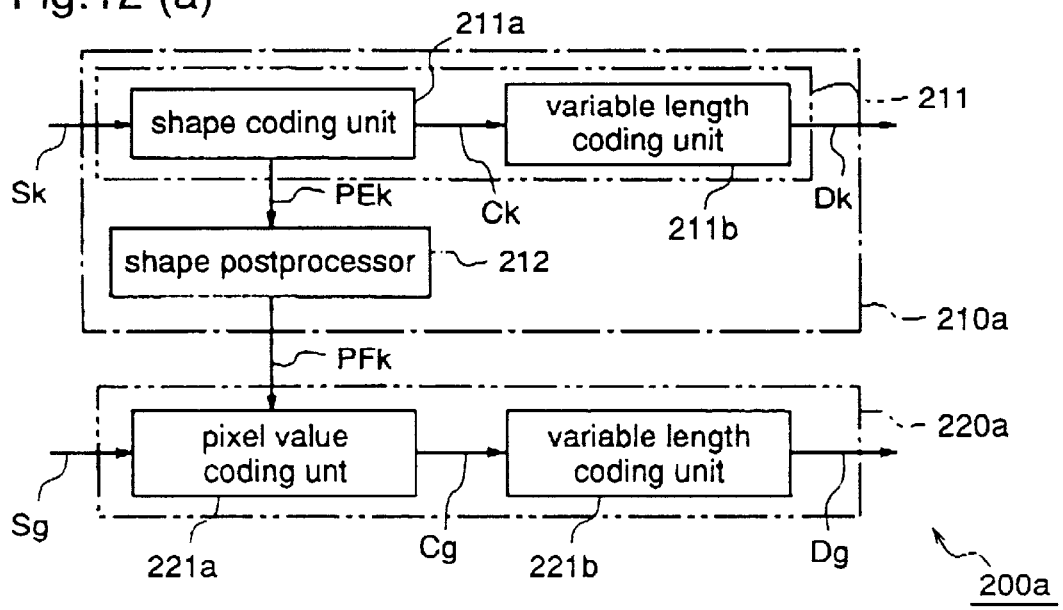
Figure 12:
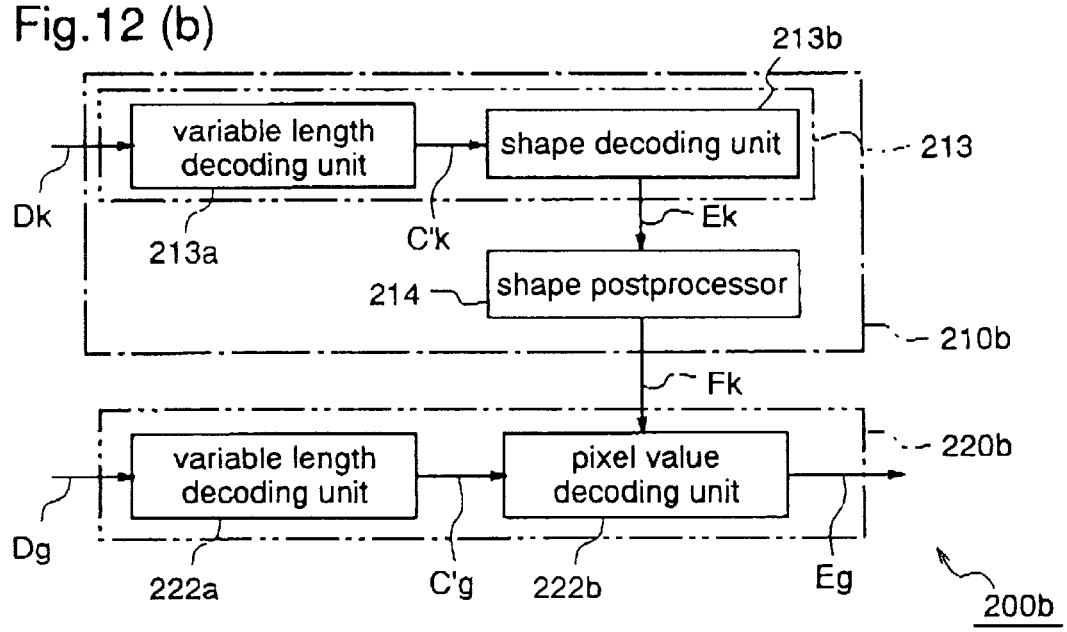
Figure 13:
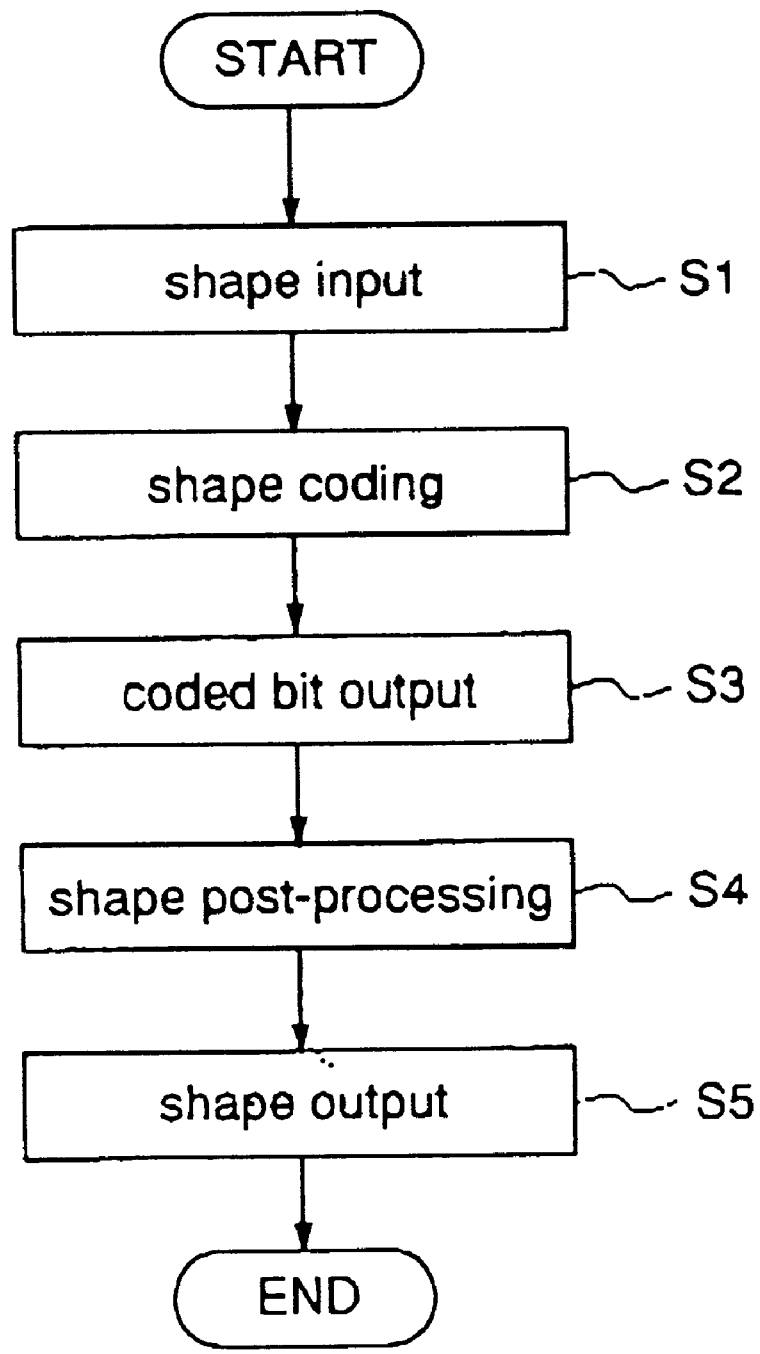
FIG. 13 is a flowchart showing coding in a prior art image signal processing system.
Figure 14:
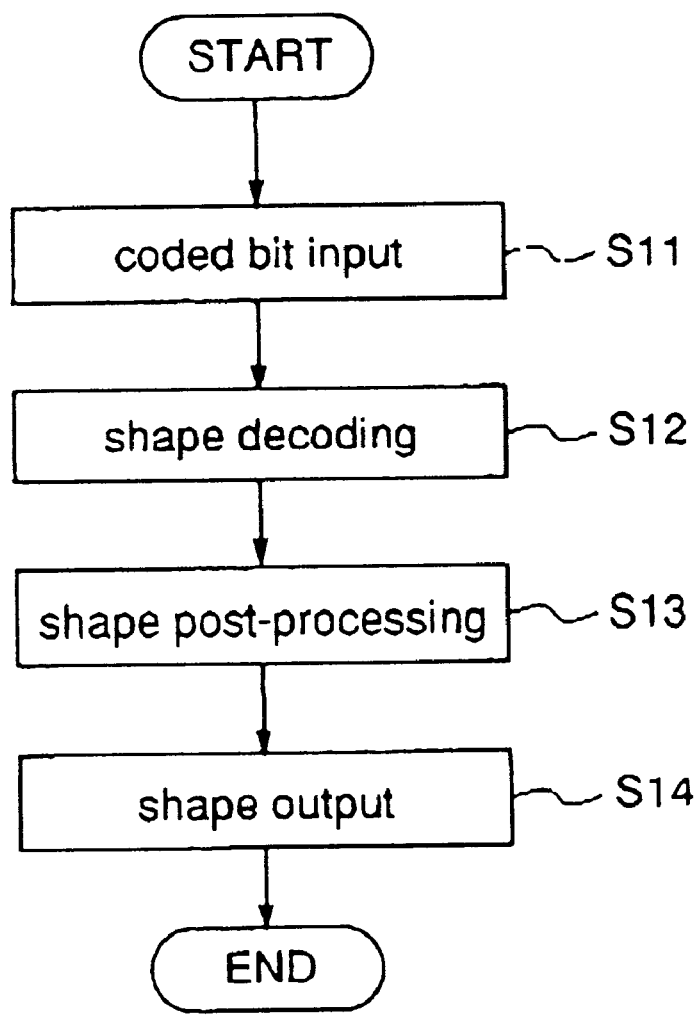
FIG. 14 is a flowchart showing decoding in a prior art image signal processing system.
Figure 15:
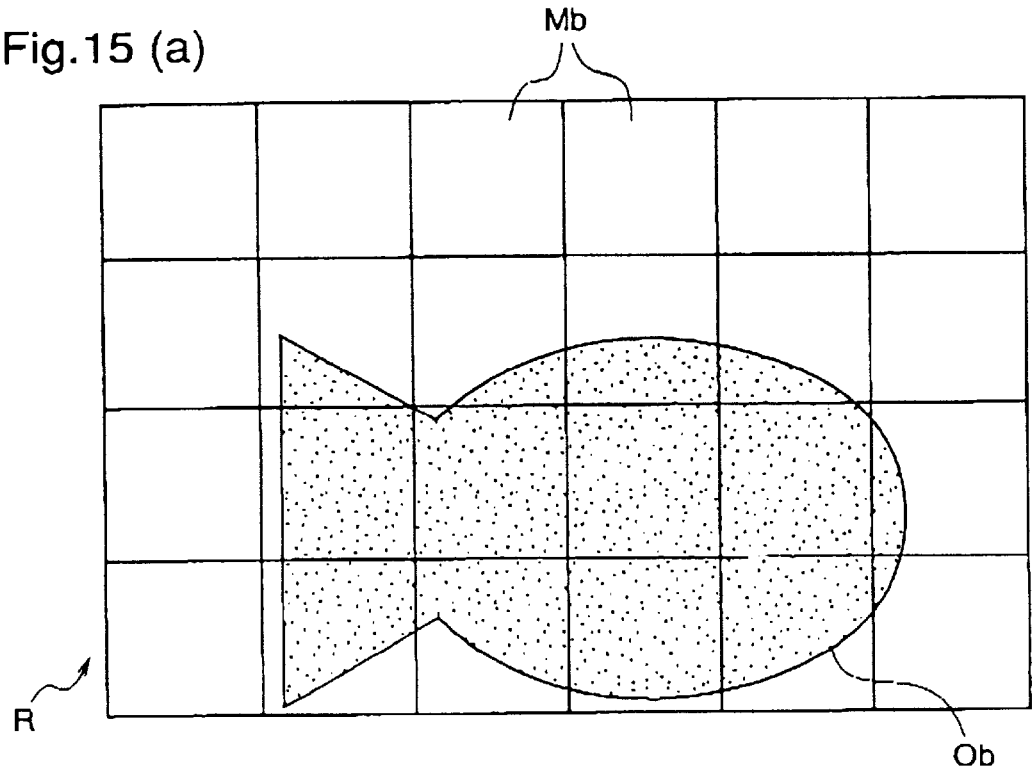
FIGS. 15(a) and 15(b) are diagrams showing pixel value coding for each macroblock according to MPEG4.
Figure 15:
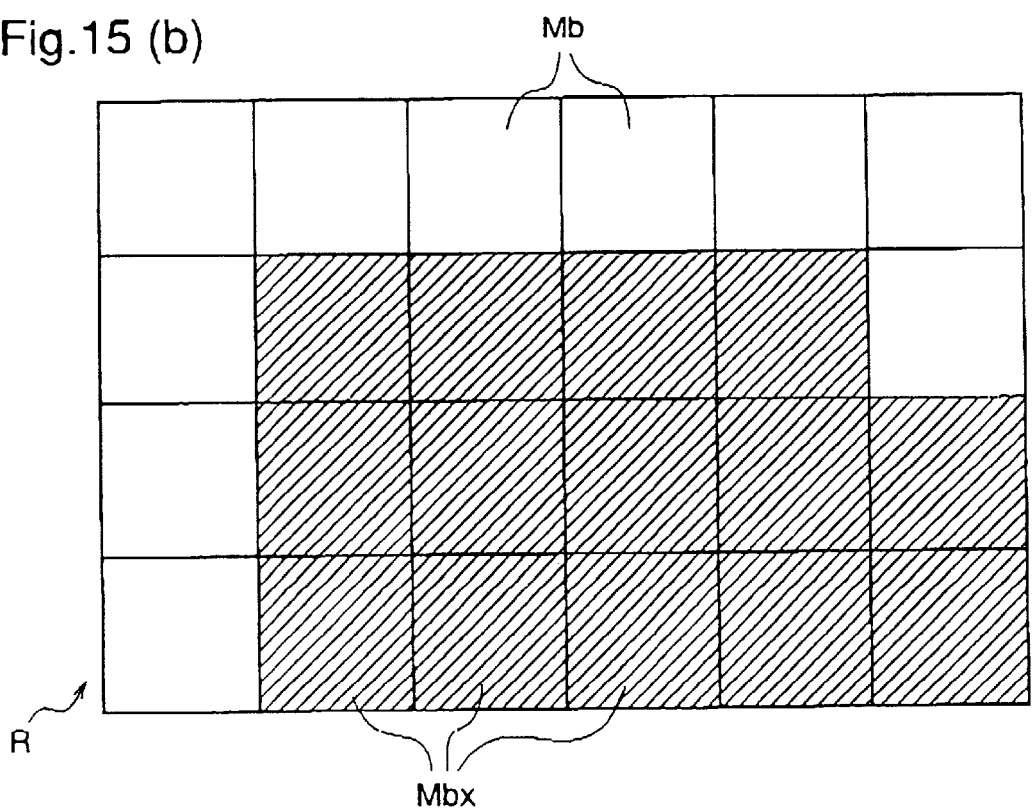
Figure 16:
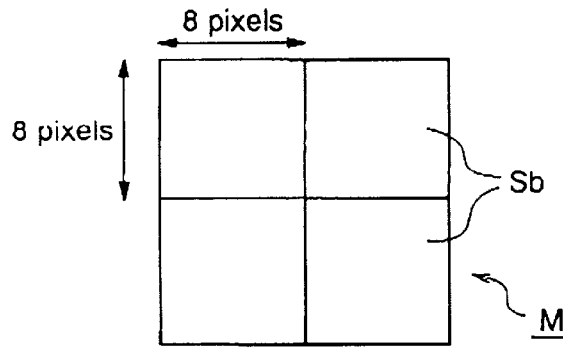
FIGS. 16(a)–16(c) are diagrams showing pixel value coding for each subblock according to MPEG4.
Figure 16:
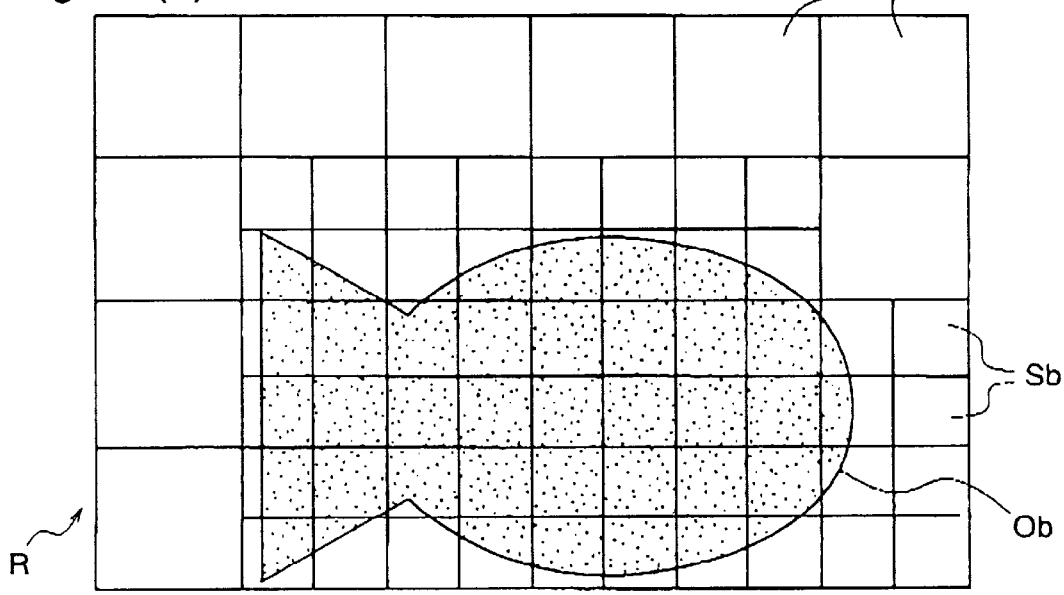
Figure 16:
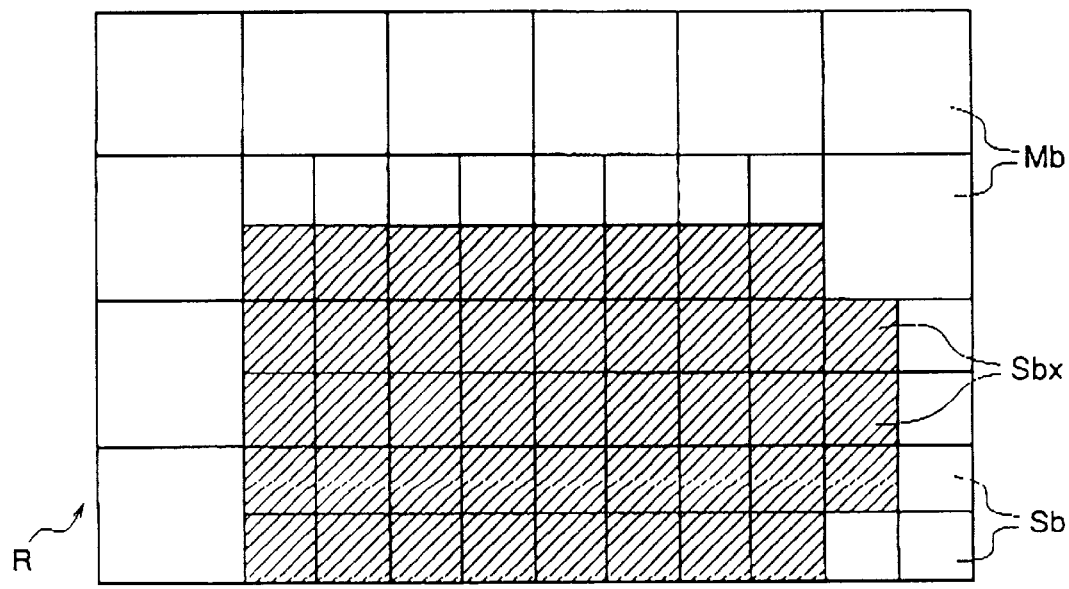
Figure 17:
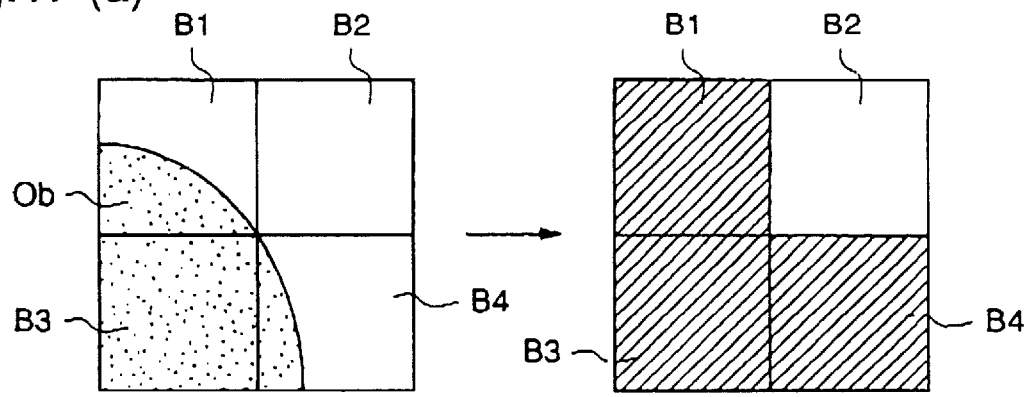
FIGS. 17(a)–17(c) are diagrams showing a case in which a block located outside an object is shape post-processed, and changed into a block located inside an object.
Figure 17:
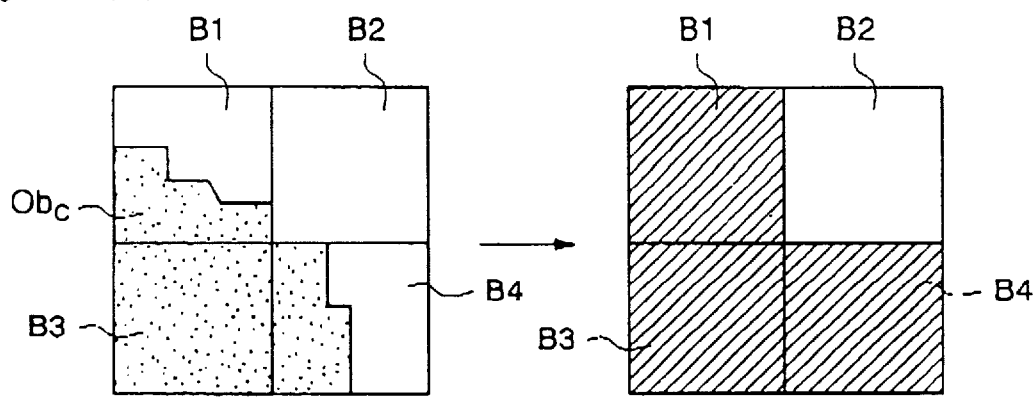
Figure 17:
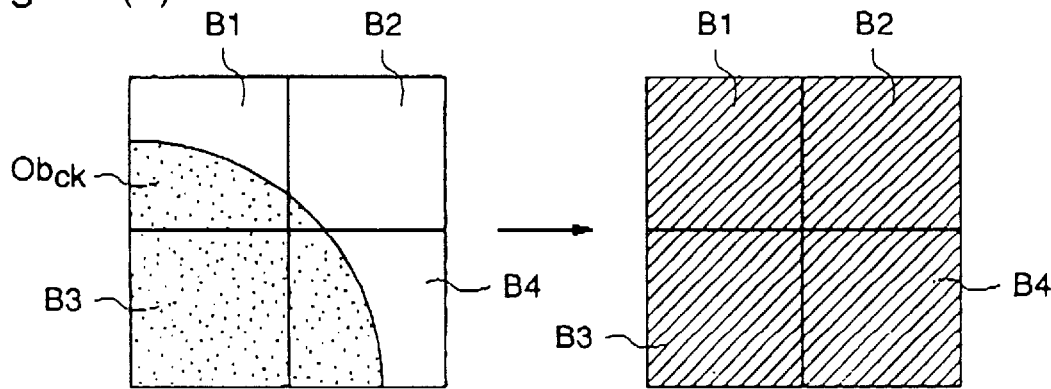

Referring to FIG. 1, there is illustrated a shape coding apparatus of the first embodiment according to MPEG4, referred to herein by reference number 110a, which corresponds to the shape coding apparatus 210a in the prior art coding circuit 200a in FIG. 12(a). First, construction of the shape coding apparatus 110a will be described with reference to FIG. 1.

The shape coding apparatus 110a is used to code an object shape signal Sk for each unit region (the macroblock and subblock) on a display screen. More specifically, the apparatus 110a includes a shape encoder 211 for receiving an object shape signal Sk included in an image display signal, performing shape coding and variable length coding to the shape signal Sk to generate a coded shape bit stream Dk, and performing shape decoding to a signal which is in the middle of coding (a signal in which the object shape signal Sk has been shape coded) to generate a locally decoded shape signal PEk, and a shape postprocessor 212 for performing shape post-processing to the signal PEk to generate a shape post-processed signal PFk.

The shape coding apparatus 110a further includes a switch 12 provided between an output area of the shape encoder 211 and an input area of the shape postprocessor 212, a select switch 13 for selecting one of the signals PFk (shape post-processed signal) and PEk (locally decoded shape signal) from the shape postprocessor 212 and the shape encoder 211, respectively, and a shape analyzer 11 for analyzing the locally decoded shape signal PEk for each unit region to decide whether to perform shape post-processing to the signal PEk, and controlling the switches 12 and 13 using a switch control signal SWc on the basis of the decision result, the switch 13 outputting a reference signal Rc for coding (a shape signal for coding) as a selected output signal.

Next, operation of the apparatus 110a will be described along flow in FIG. 2.

In Step S1, the object shape signal Sk is input to the shape coding apparatus 110a. In Step S2, the shape encoder 211 performs shape coding to the signal Sk. In Step S3, the shape encoder 211 performs variable length coding to the shape coded signal, and outputs the resulting coded shape bit stream Dk. At this time, the shape encoder 211 performs shape decoding to the shape coded signal, and outputs the resulting locally decoded shape signal PEk.

In Step S4a, the locally decoded shape signal PEk is input to the shape analyzer 11, which analyzes the signal PEk and decides whether to perform shape post-processing to the signal PEk. The shape analyzer 11 outputs the control signal SWc, in accordance with which, the switch 12 is turned on/off, and the select switch 13 selects one of the signals PEk and PFk.

When decided that a block to-be-coded includes at least a part of an object (a block located inside an object) from an analysis result of the analyzer 11, the switch 12 is turned on and the select switch 13 selects the output signal PFk from the shape postprocessor 212 in accordance with the switch control signal SWc. In this case, the shape postprocessor 212 performs shape post-processing to the signal PEk from the shape encoder 211 (Step S4b), and outputs the signal PFk as the reference signal Rc.

On the other hand, when decided that a block to-be-coded does not include any part of an object (a block located outside an object) from an analysis result of the analyzer 11, the switch 12 is turned off and the select switch 13 selects the locally decoded shape signal PEk from the shape encoder 211, whereby the signal PEk is output as the reference signal Rc.

Hereinafter, the shape post-processing will be described in detail with reference to FIGS. 3(a) and 3(b).

Illustrated in FIGS. 3(a) and 3(b) are a case in which a block located outside an object is subjected to shape post-processing, and changed into a block located inside an object. In these figures, the same reference numerals as those in FIGS. 17(a)–17(c) and 18(a)–18(c) designate the same or corresponding parts, and a shape post-processing target pixel Gx is represented by dots and pixels located inside an object are represented by oblique lines.

Figure 18:
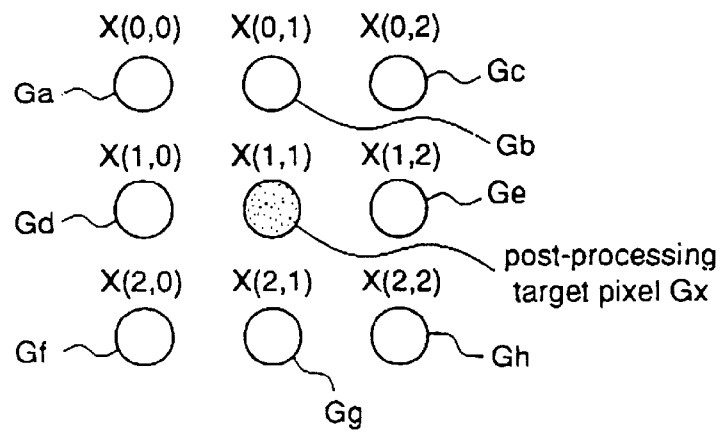
FIGS. 18(a)–18(c) are diagrams showing prior art shape post-processing.
Figure 18:
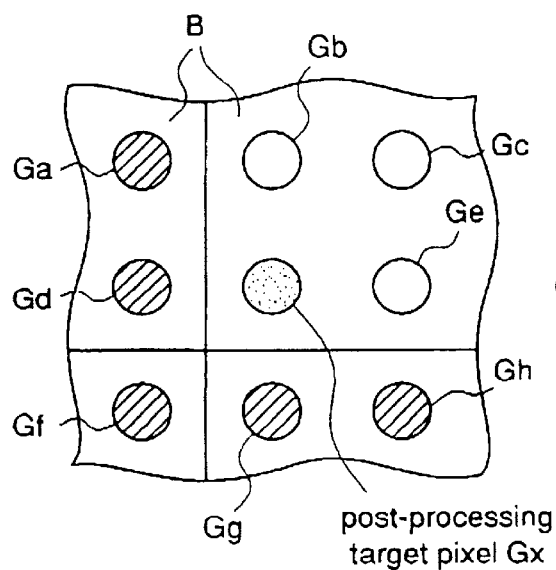
Figure 18:
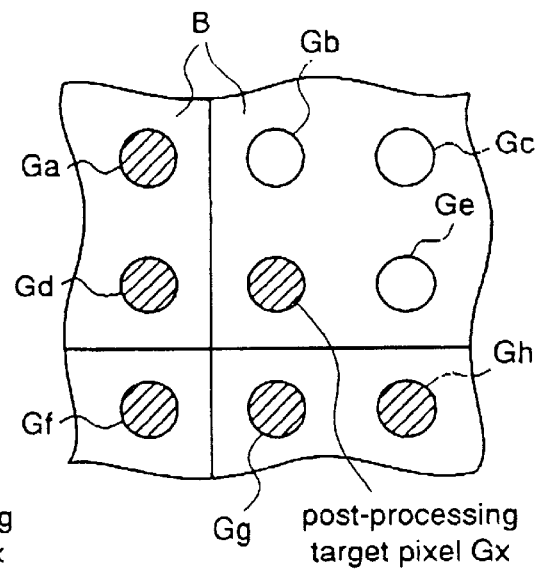

In this shape post-processing, as in the case of the prior are shape post-processing shown in FIGS. 18(a)–18(c), it is decided whether the pixel Gx is a pixel located inside or outside an object according to decision by majority, in which comparison is made between the number of pixels located inside an object and the number of pixels outside the object, with respect to the 9 pixels Ga~Gh and Cx.

That is, in a case where there are block boundaries between the pixel Gx and the pixel Gd located left, and between the pixel Gx and the pixel Gg located below, respectively as shown in FIG. 3(a), even if a block B2 including the pixel Gx is a block located outside an object, shape post-processing of the object shape signal results in a block B2 located inside an object.

In this first embodiment, the shape analyzer 11 analyzes the locally decoded shape signal PEk to decide whether a block to-be-coded is a block located outside an object, and when decided that the block to-be-coded is not the block outside the object, the signal PEk will be subjected to shape post-processing.

More specifically, in a case where a locally decoded shape signal PEk of an upper right block B2 indicates that the block B2 is a block located outside an object, and a locally decoded shape signal PEk of each of an upper left block B1, a lower left block B3, and a lower right block B4 indicates that the corresponding block is a block located inside an object as shown in FIG. 4(b), the signal PEk of the block B2 will not be subjected to shape post-processing and is directly output as a reference signal Rc for coding, while the signal PEk of each of the blocks B1, B3, and B4 is subjected to shape post-processing, resulting in a shape post-processed signal PFk indicated a smooth shape, which is output as the reference signal Rc. Therefore, the reference signal Rc of the upper right block B2 does not indicate a block located inside an object.

Comparing an object shape (FIG. 3(b)) obtained from the signal in which the signal PEk of the 4 blocks has been subjected to shape post-processing with an object shape (FIG. 4(c)) obtained from the signal in which the signal PEk of blocks which require post-processing has been subjected to post-processing, the object shape in FIG. 4(c) has discontinuity at boundaries of the upper right block, which is visually allowable. An example in FIG. 4(a) is identical to that in FIG. 17(a).

Thus, according to the first embodiment, a block located outside an object will not change into an object located inside an object after shape post-processing, although this may happen in the prior art coding apparatus 210a. In other words, the shape post-processing does not increase the number of blocks required for coding a pixel value signal.

As a result, visual distortion of an object shape is eliminated by shape post-processing, and simultaneously, the number of bits to-be-coded required for coding a pixel value signal is not increased. In addition, a locally decoded shape signal PEk of a block located inside an object is subjected to shape post-processing as in the case of the prior are, which provides a visually satisfactory object shape.

Embodiment 2

Figure 5:
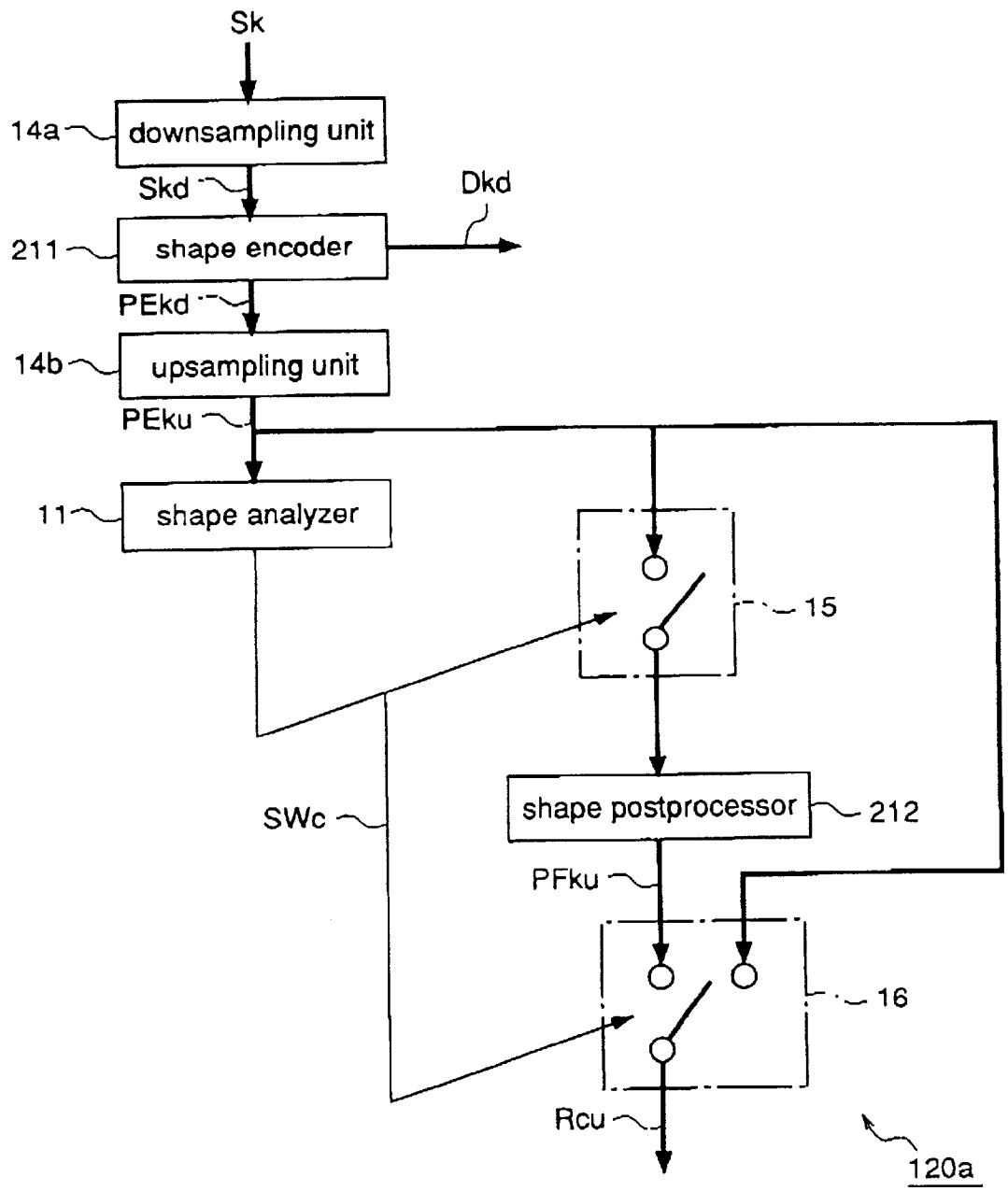
FIG. 5 is a block diagram showing a shape coding apparatus according to a second embodiment of the present invention.

FIG. 5 is a block diagram showing a shape coding apparatus according to a second embodiment of the present invention. This second embodiment describes claim 2 and 10.

In FIG. 5, there is illustrated a shape coding apparatus referred to herein by reference numeral 120a, and the same reference numerals as those in FIG. 1 designate the same or corresponding parts of the shape coding apparatus 110a of the first embodiment. First, construction of the shape coding apparatus 120a will be described with reference to FIG. 5.

The shape coding apparatus 120a includes a downsampling unit 14a provided at a previous stage of a shape encoder 211, for downsampling an object shape signal Sk input externally, thereby reducing the number of its pixels to-be-coded, to generate a downsampled shape signal Skd, and an upsampling unit 14b provided at a next stage of the shape encoder 211, for upsampling a locally decoded shape signal PEkd from the shape encoder 211, thereby increasing the number of it pixels, to generate an upsampled shape signal PEku. The shape encoder 211 is used for performing shape coding and variable length coding to the signal Skd from the downsampling unit 14a to generate a coded shape bit stream Dkd, and performing shape decoding to a signal which is in the middle of coding (a signal in which the signal Skd has been shape coded), to generate a locally decoded shape signal PEkd.

The shape coding apparatus 120a further includes a shape analyzer 11 for analyzing the signal PEku from the upsampling unit 14b for each unit region to decide whether to perform shape post-processing to the signal PEku, a shape postprocessor 212 for performing shape post-processing to the signal PEku as in the case of the first embodiment, like the shape coding apparatus 110a of the first embodiment, a switch 15 provided between the upsampling unit 14b and the shape postprocessor 212, and a select switch 16 for selecting one of output signals from the shape postprocessor 212 and the upsampling unit 14b, respectively. These switches 15 and 16 are respectively controlled in accordance with a switch control signal SWc on the basis of the decision result from the shape analyzer 11, and the switch 16 is used for outputting one of the output signals from the shape postprocessor 212 and the upsampling unit 14b as a reference signal Rcu for coding.

Operation of the shape coding apparatus 120a of this embodiment is basically identical to that of the shape coding apparatus 110 of the first embodiment except that the input object shape signal Sk is downsampled by the downsampling unit 14a and output to the shape encoder 211, and the signal PEkd from the shape encoder 211 is upsampled by the upsampling unit 14b and output to the shape analyzer 11, the shape postprocessor 212, and the select switch 16.

In this embodiment, the downsampling unit 14a at a previous stage of the shape encoder 211 downsamples the object shape signal Sk, thereby reducing the number of its pixels and, the shape encoder 211 performs coding to the resulting downsampled signal Skd. Therefore, the number of bits of the coded shape bit stream Dkd can be reduced, in addition to effects provided by the first embodiment.

In addition, the locally decoded shape signal PEkd from the shape encoder 211 is upsampled by the upsampling unit 14b at the next stage, which increases possibility that a block located outside an object changes into a block located inside an object, as compared to a case in the first embodiment. Therefore, analysis of the upsampled shape signal PEku by the shape analyzer 11 and changing of processing by the shape postprocessor (filter) 212 on the basis of the analysis result, becomes more significant, in the second embodiment rather than in the first embodiment.

Although in the first and second embodiments, the shape coding apparatuses 110a and 120a decide whether to perform shape post-processing to the locally decoded shape signals PEk and PEkd on the basis of their analysis results, respectively, and performs switching, this switching is not limited thereto.

Alternatively, plural shape postprocessors of different processing contents may be provided, and a shape analyzer may be used for obtaining analysis results for the plural shape postprocessors. In this case, on the basis of a result, an output signal from the corresponding postprocessor is selected, and when a specific result is obtained, shape post-processing may not be performed to the corresponding locally decoded shape signal.

Further, although the shape analyzer 11 decides whether to perform shape post-processing to the upsampled shape signal PEku from the upsampling unit 14b on the basis of the signal PEku, it may decide whether to perform shape post-processing to the upsampled shape signal PEku on the basis of the locally decoded shape signal PEkd from the shape encoder 211. In this case, amount of data processed by the shape analyzer 11 can be reduced.

Embodiment 3

Figure 6:
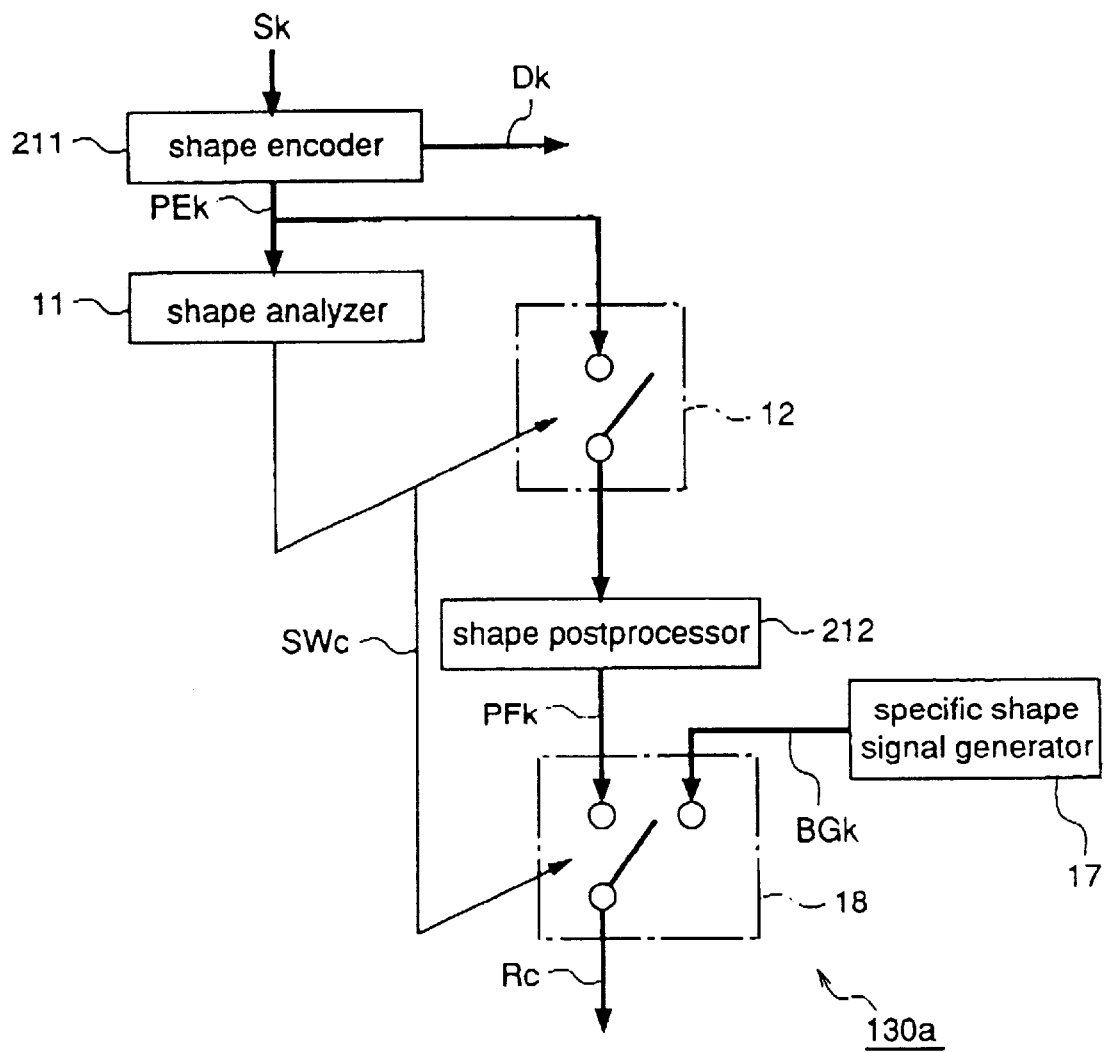
FIG. 6 is a block diagram showing a shape coding apparatus according to a third embodiment of the present invention.

FIG. 6 is a block diagram showing a shape coding apparatus according to a third embodiment of the present invention. This third embodiment describes claim 1~3, and 9 as in the first embodiment.

In FIG 6, there is illustrated a shape coding apparatus 130a, and the same reference numerals as those in FIG. 1 designate the same or corresponding parts of the shape coding apparatus 110a of the first embodiment. The shape coding apparatus 130a of this embodiment includes a specific shape signal generator 17 for generating a specific shape signal BGk indicating a block to-be-coded is a block located outside an object, and a select switch 18 for selecting one of an output signal PFk from the shape postprocessor 212 and the output signal BGk from the generator 17, by which the select switch 13 of the shape coding apparatus 110a of the first embodiment has been replaced.

A shape analyzer 11 of this embodiment functions as stated below. In a case where the analyzer 11 decides that there are little pixels, for example, there are less than 3 pixels in a block to-be-coded, on the basis of a locally decoded shape signal PEk of the block, it generates a switch control signal SWc in accordance with which the switch 12 is turned off and the select switch 18 selects the signal BGk from the generator 17, or in other cases, it generates a switch control signal SWc in accordance with which the switch is turned on and the switch 18 selects the signal PFk from the shape postprocessor 212.

In brief, construction of the third embodiment is identical to that of the shape coding apparatus 110a of the first embodiment except that the select switch 18 selects the shape post-processed signal PFk or the specific shape signal BGk indicating that pixels in a block to-be-coded are all located outside an object.

In the third embodiment constructed above, when the shape analyzer 11 decides that there are little pixels in a block to-be-coded, the select switch 18 selects the signal BGk from the generator 17, and outputs the signal BGk as the reference signal for coding Rc. Therefore, the number of blocks to-be-coded, i.e., blocks located inside an object which require coding, can be further reduced, whereby the number of bits in coding pixel values can also be further reduced when coding a pixel value signal, as compared with a case in the first embodiment using the reference signal Rc.

Although in the third embodiment, the shape coding apparatus 130a decides whether to perform shape post-processing to the locally decoded shape signal PEk on the basis of its analysis result and performs switching, this switching is not limited thereto.

Alternatively, plural shape postprocessors of different processing contents may be provided, and a shape analyzer may be used for obtaining analysis results for the plural shape postprocessors. In this case, on the basis of a result, an output signal from the corresponding postprocessor is selected, and when a specific result is obtained, the select switch 18 selects the signal from the generator 17 and shape post-processing will not be performed.

Embodiment 4

Figure 7:
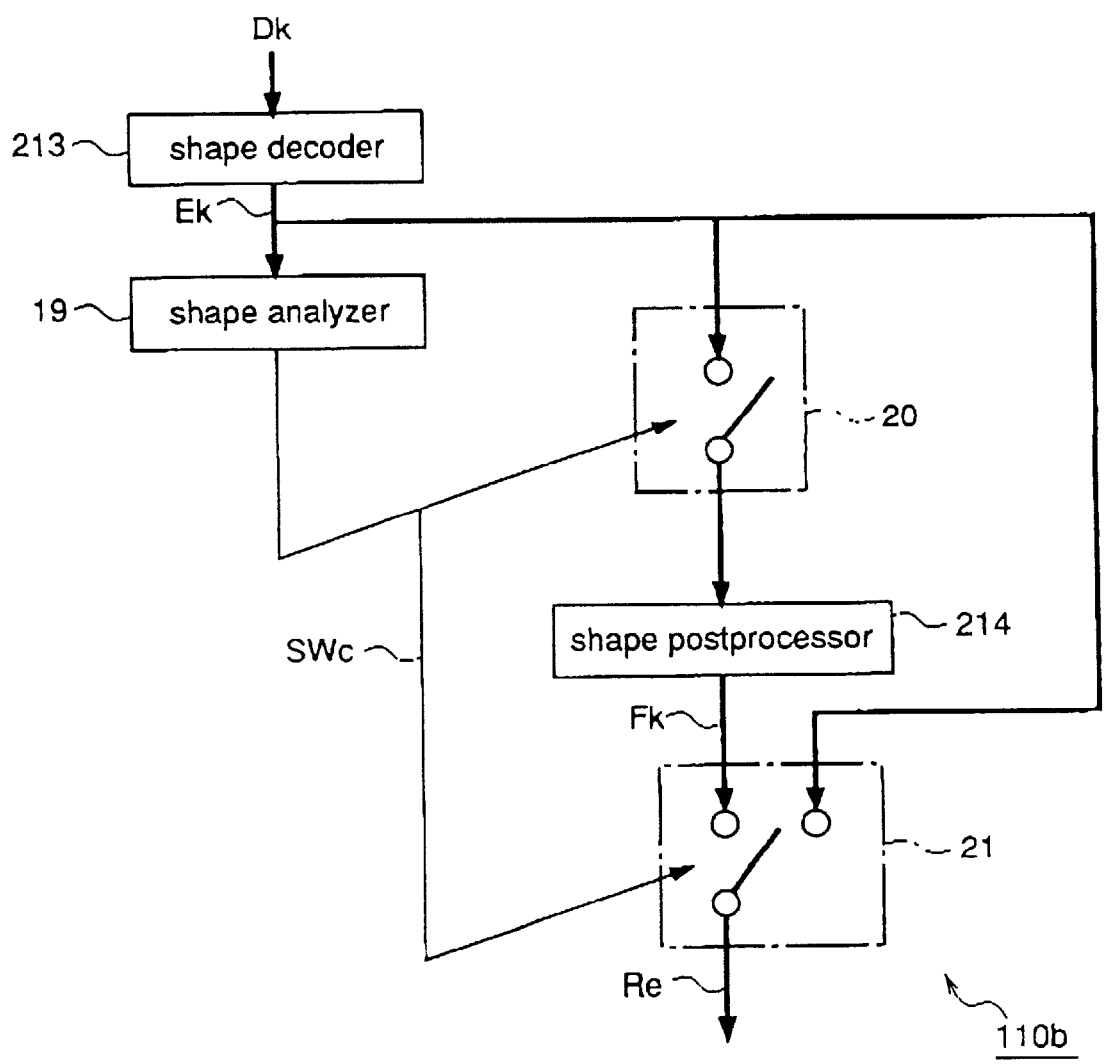
FIG. 7 is a block diagram showing a shape decoding apparatus according to a fourth embodiment of the present invention.
Figure 8:
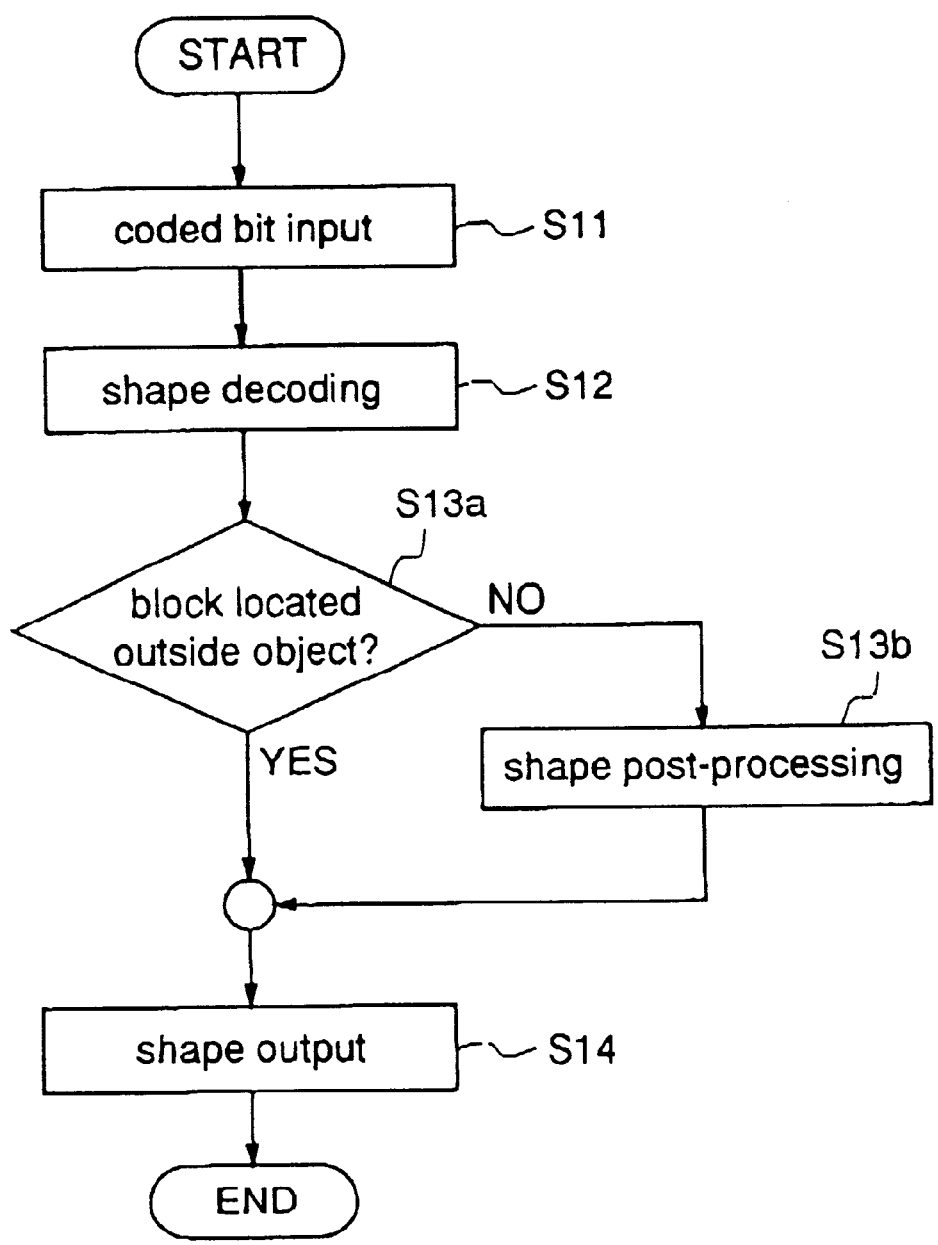
FIG. 8 is a flowchart showing decoding of the shape decoding apparatus of the fourth embodiment.

FIG. 7 is block diagram showing a shape decoding apparatus according to a fourth embodiment of the present invention, and FIG. 8 is a flowchart showing decoding of the shape decoding apparatus. This fourth embodiment describes claim 5~7, and 11.

In FIG. 7, there is illustrated a shape decoding apparatus 110b of the fourth embodiment according to MPEG4, which corresponds to the shape decoding apparatus 210b in the prior art decoding circuit 200b in FIG. 12(b), and the same reference numerals as those in FIG. 12(b) designate the same or corresponding parts of the prior art shape decoding apparatus 210b. First, construction of the shape decoding apparatus 110b will be described with reference to FIG. 7.

The shape decoding apparatus 110b is used to decode a variable length coded bit stream Dk for each unit region (for each macroblock or subblock as described above) on a display screen, and includes a shape decoder 213 for receiving the bit stream Dk, and performing variable length decoding and shape decoding to the bit stream Dk to generate a decoded shape signal Ek, and a shape postprocessor 214 for performing shape post-processing to the signal Ek to generate a shape post-processed signal Fk.

The shape decoding apparatus 110b further includes a switch 20 provided between an output area of the shape decoder 213 and an input area of the shape postprocessor 214, a select switch 21 for selecting one of output signals Fk (shape post-processed signal) and Ek (decoded shape signal), and a shape analyzer 19 for analyzing the decoded shape signal Ek for each block to-be-coded to decide whether to perform shape post-processing to the decoded shape signal Ek, and controlling the switches 20 and 21 using a switch control signal SWc on the basis of the decision result, the switch 21 outputting a reference signal Re for decoding (a decoding object shape signal) as a selected signal.

Next, operation of the apparatus 110b will be described with reference to FIG. 8.

In Step S11, the bit stream Dk is input to the decoding apparatus 110b. In Step S12, the shape decoder 213 performs variable length decoding and shape decoding to the bit stream Dk, and outputs the decoded shape signal Ek. Assuming that this bit stream Dk is the variable length coded bit stream Dk created by the shape coding apparatus 110a of the first embodiment in FIG. 1, the decoded shape signal Ek corresponds to the locally decoded shape signal PEk of the shape coding apparatus 110a of the first embodiment, and therefore subsequent processing is identical to that of the shape coding apparatus 110a.

In brief, in Step S13a, the decoded shape signal Ek is input to the shape analyzer 19, which analyzes the signal Ek and decides whether to perform shape post processing to the signal Ek. The shape analyzer 19 outputs the control signal SWc on the basis of the decision result, in accordance with which the switch 20 is turned on/off, and the select switch 21 selects one of the signals Ek and Fk.

More specifically, when decided that a block to-be-coded includes at least a part of an object (a block is located inside an object) from an analysis result of the analyzer 19, the switch 20 is turned on and the select switch 21 selects the output signal Fk from the shape postprocessor 214 in accordance with the switch control signal SWc. In this case, the shape postprocessor 214 performs shape post-processing to the signal Ek from the shape decoder 213 (Step S13b), and outputs the signal Fk as the reference signal Re for decoding (Step S14).

On the other hand, when decided that a block to-be-coded does not include any part of an object (a block is located outside an object), the switch 20 is turned off and the select switch 21 selects the output signal Ek from the shape decoder 213 in accordance with the control signal SWc, whereby the signal Ek from the shape decoder 213 is directly output as the reference signal Re for decoding (Step S14).

Clearly, the decoded shape signal Ek in which the coded shape bit stream Dk has been decoded in Step S12 of this embodiment is identical to the locally decoded shape signal PEk in which the coded shape signal of the object shape signal Sk has been locally decoded in Step S2 of the first embodiment, and the reference signal for decoding Re output in Step S14 of this embodiment is identical to the reference signal for coding Rc output in Step S5 of the first embodiment.

As a result, a pixel value signal can be decoded correctly by the use of the reference signal for decoding Re identical to the reference signal for coding Rc.

Embodiment 5

Figure 9:
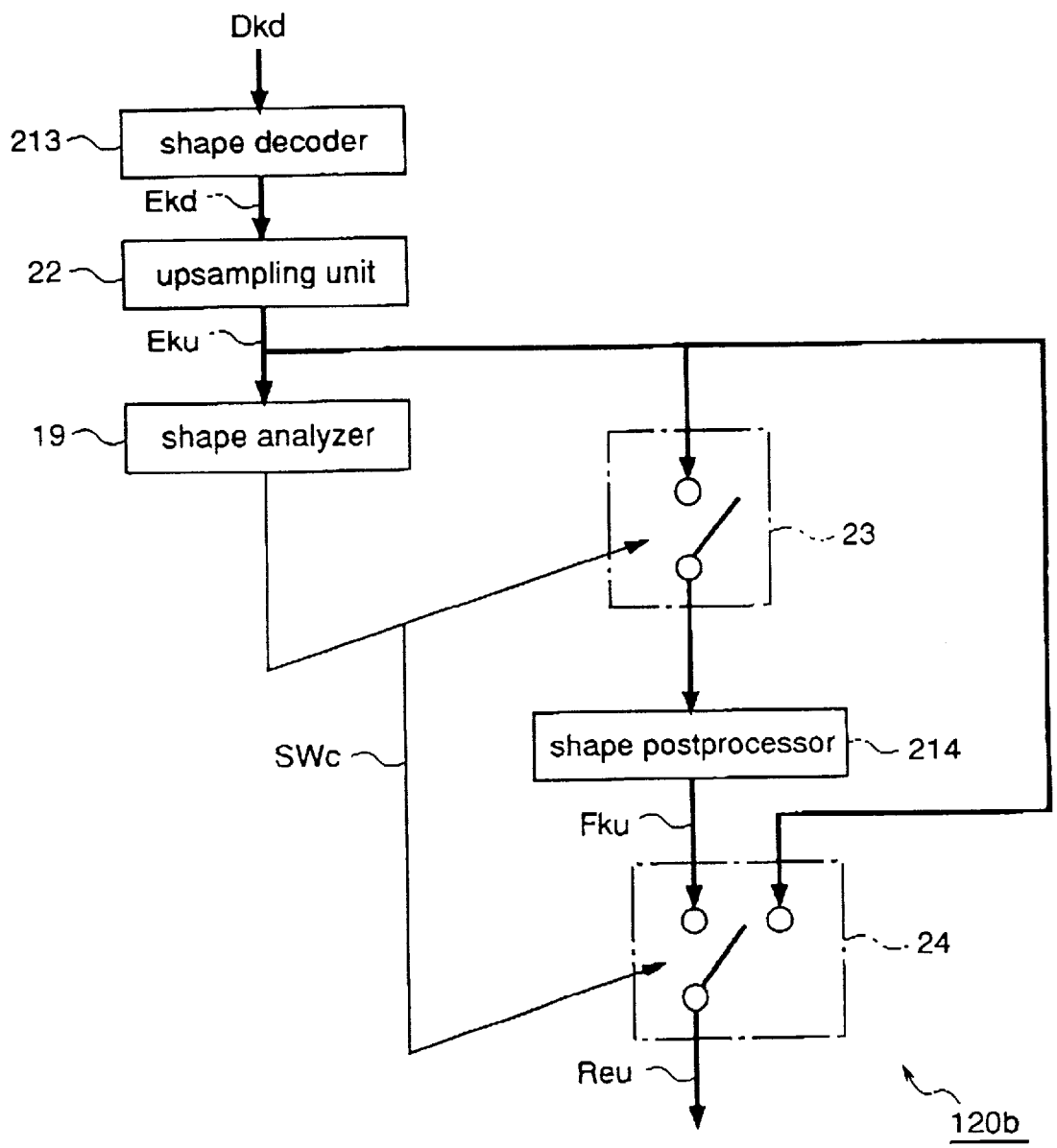
FIG. 9 is a block diagram showing a shape decoding apparatus according to a fifth embodiment of the present invention.

FIG. 9 is a block diagram showing a shape decoding apparatus according to a fifth embodiment of the present invention. This fifth embodiment describes claim 8 and 12.

In FIG. 9, there is illustrated a shape decoding apparatus 120b which decodes the coded shape bit stream Dkd which has been coded by the shape coding apparatus 120a of the second embodiment, and the same reference numerals as those in FIG. 7 designate the same or the corresponding parts of the shape decoding apparatus 110b of the fourth embodiment.

The shape decoding apparatus 120b includes an upsampling unit 22 provided at a next stage of the shape decoder 213, for upsampling a decoded shape signal Ekd from the shape decoder 213, thereby increasing the number of its pixels, to generate an upsampled shape signal Eku. The shape decoder 213 is used for performing variable length decoding and shape decoding to the bit stream Dkd from the shape coding apparatus 120a to generate a decoded shape signal Ekd.

The shape decoding apparatus 120b further includes a shape analyzer 19 for analyzing the signal Eku from the upsampling unit 22 for each block to decide whether to perform shape post-processing to the signal Eku, a shape postprocessor 214 for performing shape post-processing to the signal Eku as in the case of the fourth embodiment, like the shape coding apparatus 110b of the fourth embodiment, a switch 23 provided between an output area of the upsampling unit 22 and an input area of the shape postprocessor 214, and a select switch 24 for selecting one of signals Fku and Eku from the shape postprocessor 214 and the upsampling unit 22. These switches 23 and 24 are respectively controlled in accordance with a switch control signal SWc on the basis of the decision result from the shape analyzer 19.

Operation of the shape decoding apparatus 120b of this embodiment is basically identical to that of the shape decoding apparatus 110b of the fourth embodiment except that the output signal Ekd from the shape decoder 213 is upsampled by the upsampling unit 22 and output to the shape analyzer 19, the shape postprocessor 214, and the select switch 24.

In the shape decoding apparatus 120b thus constructed, assuming that the variable length coded bit stream Dkd of this embodiment is the variable length coded bit stream Dkd created by the shape coding apparatus 120a of the second embodiment in FIG. 5, the decoded shape signal Ekd from the shape decoder 213 is identical to the locally decoded shape signal PEkd from the shape encoder 211 of the shape coding apparatus 120a and therefore shape analysis and shape post-processing is performed to the decoded shape signal Ekd as in the case of the second embodiment.

As a result, the reference signal Reu for decoding identical to the reference signal Rcu for coding obtained by the shape coding apparatus 120a of the second embodiment is obtained, and a pixel value signal can be decoded correctly by the use of the reference signal Reu.

Although in the fourth and fifth embodiments, the shape decoding apparatus 110b and 120b decide whether to perform shape post-processing to the decoded shape signal Ek and Ekd on the basis of the basis of their analysis results, respectively, and performs switching, this switching is not limited thereto.

Alternatively, plural shape postprocessors of different processing contents may be provided, and a shape analyzer may be used for obtaining analysis results of the corresponding postprocessors. In this case, on the basis of a result, an output signal from the corresponding postprocessor is selected, and when a specific result is obtained, shape post-processing may not be performed to the corresponding locally decoded shape signal.

Further, although the shape analyzer 19 decides whether to perform shape post-processing to the upsampled shape signal Eku from the upsampling unit 22 on the bases of the signal EKu, it may decide whether to perform shape post-processing to the signal Eku on the basis of the decoded shape signal Ekd from the shape decoder 213. In this case, amount of data processed by the shape analyzer 19 can be reduced.

Embodiment 6

Figure 10:
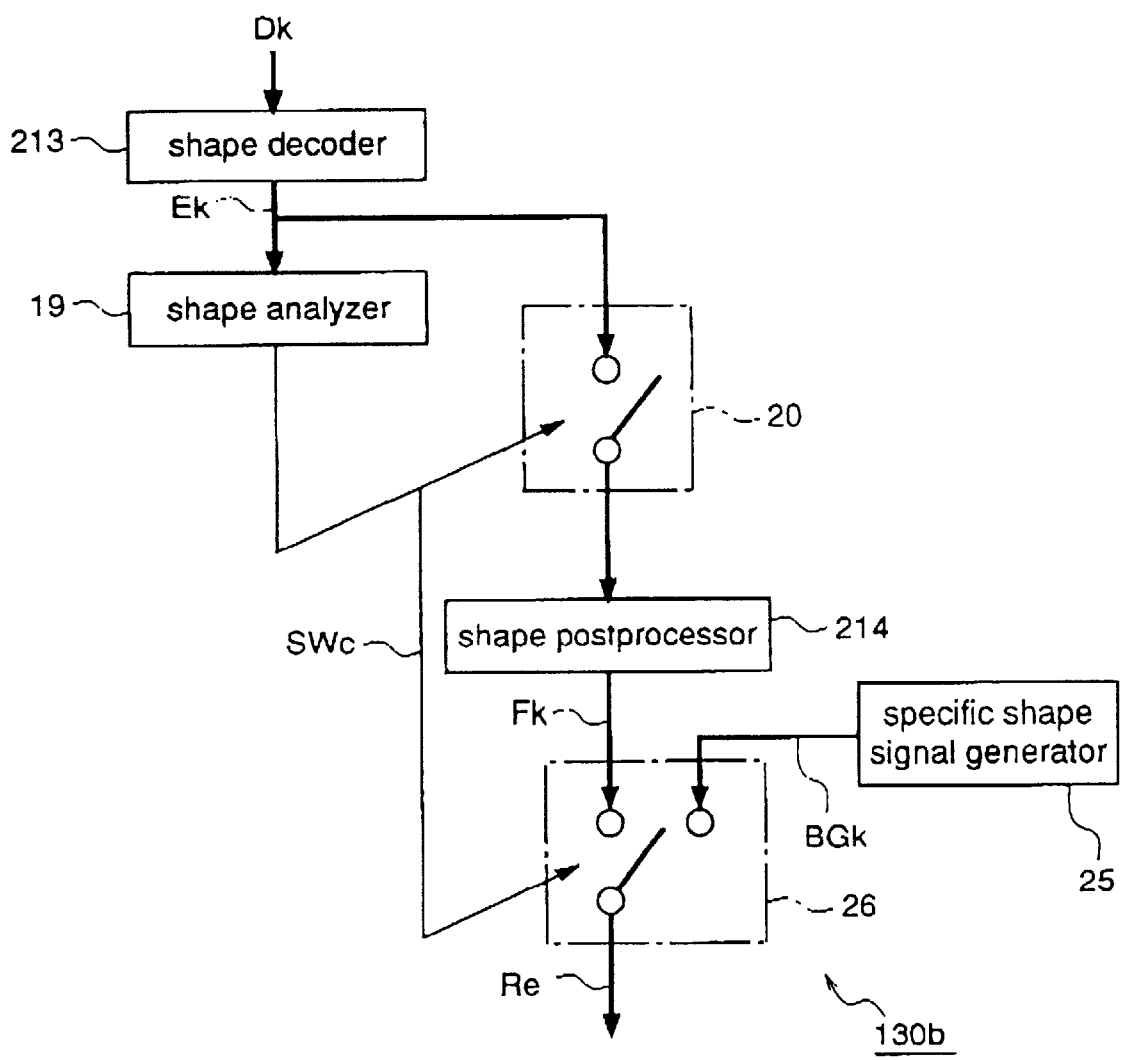
FIG. 10 is a block diagram showing a shape decoding apparatus according to a sixth embodiment of the present invention.
Figure 11:
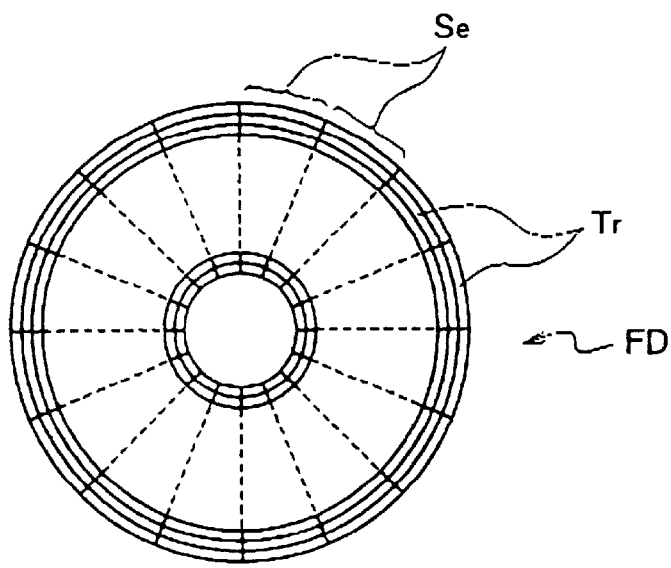
FIGS. 11(a)–11(c) are diagrams showing a data recording medium in which a program for implementing the shape coding or shape decoding method of each embodiment in a computer system is stored.
Figure 11:
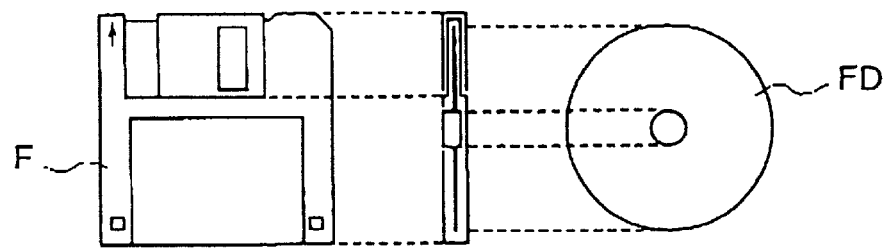
Figure 11:
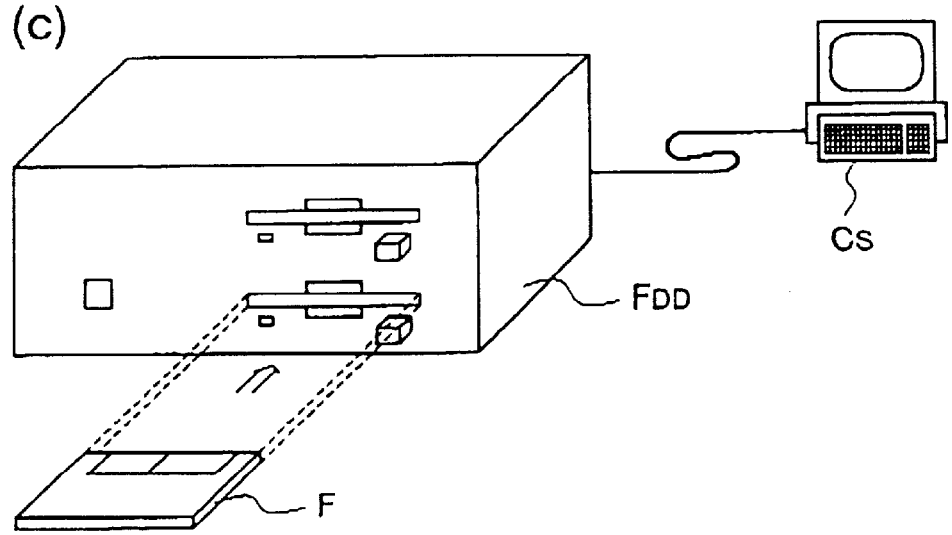

FIG. 10 is a block diagram showing a shape decoding apparatus according to a sixth embodiment of the present invention. This sixth embodiment describes claim 5~7 and 11.

In FIG. 10, there is illustrated a shape decoding apparatus 130b of this embodiment, and the same reference numerals as those in FIG. 7 designate the same or the corresponding parts of the shape decoding apparatus 110b of the fourth embodiment. The shape decoding apparatus 130b of this embodiment includes a specific shape signal generator 25 for generating a specific shape signal BGk indicating that a block to-be-decoded is a block located outside an object, and a select switch 26 for selecting an output signal Fk from the shape postprocessor 214 and the output signal BGk from the generator 25, by which the select switch 21 of the fourth embodiment has been replaced.

A shape analyzer 19 of this embodiment functions as stated below. In a case where the analyzer 19 decides that there are little pixels, for example, there are less than 3 pixels in a block to-be-decoded, on the basis of a locally decoded shape signal Ek of the block, it generates a switch control signal SWc in accordance with which the select switch 20 is turned off and the select switch 26 selects the output signal BGk from the generator 25, or in other cases, it generates a switch control signal SWc in accordance with which the switch 20 is turned on and the switch 26 selects the signal Fk from the shape postprocessor 214.

In brief, construction of the apparatus 130b of the sixth embodiment is identical to that of the apparatus 110b of the fourth embodiment except that the select switch 26 selects one of the shape post-processed signal Fk and the specific shape signal BGk indicating that pixels in a block to-be-decoded are all pixels located outside an object.

In the shape decoding apparatus 130b thus constructed, assuming that the coded shape bit stream Dk input to the shape decoder 213 is the coded shape bit stream Dk created by the shape coding apparatus 130a of the third embodiment in FIG. 6, the decoded shape signal Ek from the shape decoder 213 is identical to the locally decoded object shape signal BEk from the shape encoder 211 of the shape coding apparatus 130a, and therefore shape analysis and shape post-processing is performed to the shape signal Ek as in the case of the third embodiment.

As a result, in the shape decoding apparatus 130b, a reference signal Re for decoding identical to the reference signal Rc for coding obtained by the shape coding apparatus 130a is obtained, and a pixel value signal can be decoded correctly by the use of the reference signal Re.

Further, although the shape coding apparatus 130b has been described in the sixth embodiment, in which it is decided whether to perform shape post-processing to the decoded shape signal Ek on the basis of its analysis result, and switching is performed, this switching is not limited thereto as in the cases of the fourth and fifth embodiments.

Alternatively, plural shape postprocessors of different processing contents may be provided, and a shape analyzer may be used for obtaining analysis results for the plural shape postprocessors. In this case, on the basis of a result, an output signal from the corresponding postprocessor is selected, and when a specific result is obtained, the select switch 26 selects the output signal RGK from the generator 2b, and shape post-processing will not be performed.

Embodiment 7

Figure 19:
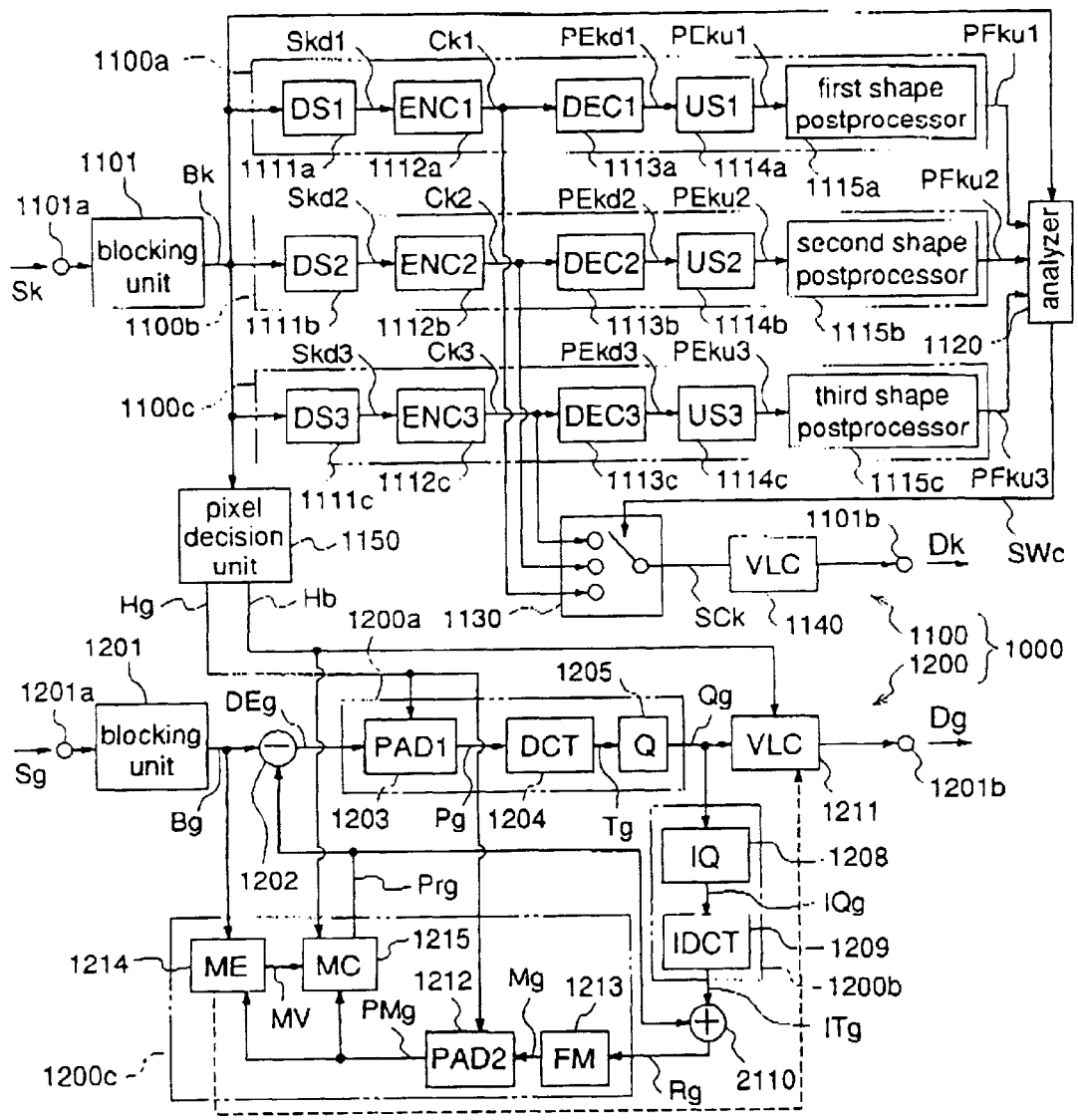
FIG. 19 is a block diagram showing a shape coding apparatus according to a seventh embodiment of the present invention.

FIG. 19 is a diagram showing a shape coding apparatus according to a seventh embodiment of the present invention. First, construction of the apparatus will be described. This seventh embodiment describes claim 15~24.

Shown in FIG. 19 is an image processing apparatus 1000 which codes a digital image signal forming an image space including an object having an arbitrary shape for each of unit regions (blocks) into which the image space is divided. The digital image signal includes a shape signal indicating a shape of an object using binary information, and a pixel value signal for assigning intensity levels to the object. The image processing apparatus 1000 comprises a shape coding apparatus 1100 for coding the shape signal, and a pixel value coding apparatus 1200 for coding the pixel value signal.

The shape coding apparatus 1100 includes a blocking unit 1101 for dividing the shape signal Sk of each frame input to an input terminal 1101a so that each of the divided shape signal Sk is included in each of blocks (image spaces) each consisting of 16×16 pixels as a coding unit, and outputting shape data Bk for each block, and first to third shape coding sections (compression and expansion) 1100a~1100c for performing compression and expansion to the shape data Bk of a target block (a block to-be-coded) from the blocking unit 1101.

For example, the shape coding section 1100b includes a second downsampling unit (DS2) 1111b for downsampling the shape data Bk in the ratio of 1/2 to generate sampled shape data Skd2, and a second shape encoder (ENC2) 1112b for performing shape coding to the data Skd2 to generate compressed shape data Ck2, the second downsampling unit 1111b and the second shape encoder 1112b constituting data compression means. The second shape coding section 1110b further includes a second shape decoder (DEC2) 1113b for performing shape decoding to the compressed shape data Ck2 to generate restored sampled data PEkd2, and a second upsampling unit (US2) 1114b for upsampling the restored sampled data pEkd2 in the ratio of 1/2 to generate expanded shape data PEku2, the shape decoder 1113b and the second upsampling unit 1114b constituting data expansion means, and a second shape postprocessor 1115b for performing shape post-processing to the expanded shape data PEKu2 as in the case of the first embodiment to generate shape post-processed data PFku2.

The first and third shape coding sections 1100a and 1100c has almost the same construction as the second shape coding section 1100b. The first shape coding section 1100a includes a first downsampling unit (DS1) 1111a, a first shape encoder (ENC1) 1112a, a first shape decoder (DEC1) 1113a, a first upsampling unit (US2) 1114a, and a first shape postprocessor 1115a. The third coding section 1100c includes a first downsampling unit (DS3) 1111c, a third shape encoder (ENC3) 1112c, a third shape decoder (DEC3) 1113c, a third upsampling unit (US3) 1114c, and a third shape postprocessor 1115c. The first downsampling unit 1111a is used for downsampling the shape data Bk in the ratio of 1/1. The first upsampling unit 1114a is used for upsampling the restored shape data PEkd1 in the ratio of 1/1. It should be noted that the downsampling unit 1111a and the upsampling unit 1114a respectively output signals from their respective previous stages. The third downsampling unit 1111c is used for downsampling the shape data Bk in the ratio of 1/4. The third upsampling unit 1114c is used for upsampling the restored shape data PEkd3 in the ratio of 1/4. The other components of the first and third shape coding sections 1100a and 1100c are identical to those of the second shape coding section 1100b.

The shape coding apparatus 1100 further includes a data select switch 1130 for selecting one of the compressed shape data Ck1~Ck3 output from the shape encoders 1112a~1112c in accordance with a select control signal SWc2, and an analyzer 1120 for comparing the shape data Bk of a target block to output data (shape post-processed data) PFku1~PFku3 from the first to third shape coding sections 1100a~1100c, deciding which of the shape post-processed data PFku1~Pfku3 correspond to shape post-processed data in which block location information included in the shape data Bk indicating whether the target block is located inside or inside an object is held, and supplying the select switch 1130 with a decision signal as the select control signal SWc2. The select switch 1130 is used for selecting compressed shape data output from a shape coding section which performs compression and expansion in the highest compression ratio, of the shape coding sections for outputting shape post-processed data in which the block location information is held, in accordance with the select control signal SWc2. The block located outside the object is a block whose pixels includes no pixels forming the object, and is called a "transparent block". The block located inside the object is a block whose pixels includes a part or all of pixels forming the object, and is called a "non-transparent block".

the shape coding apparatus 1100 further includes a variable length encoder (VLC) 1140 for performing variable length coding to compressed shape data SCk selected by the switch 1130 and outputting a coded shape signal (shape bit stream) Dk, and a pixel decision unit 1150 for receiving the data BK and outputting block location information Hb indicating whether a target block is located inside or outside an object, and pixel location information Hg indicating whether each pixel of the target block is located inside or outside an object.

Meanwhile, the pixel value coding apparatus 1200 includes a blocking unit 1201 for dividing a pixel value signal Sg of each frame input to an input terminal 1201a so that each of the divided pixel value signal Sg is included in each of blocks (image spaces) each consisting of 16×16 pixels as a coding unit, and outputting pixel data Bg for each block, and a prediction data generating section 1200c for generating prediction data (pixel data of a prediction block) Prg of the pixel data Bg of a target block from the blocking unit 1201.

The pixel value coding apparatus 1200 further includes a subtracter 1202 for outputting difference data between the pixel data Bg and the pixel data Prg as pixel data (prediction error signal) DEg of a difference block, information compression means 1200a for performing information compression to data Deg output from the subtracter 1202 and outputting pixel data Qg of a compressed difference block, and a variable length encoder (VLC) 1211 for performing variable length coding to data Qg output from the information compression means 1200a on the basis of the block location information Hb from the pixel decision unit 1150, and outputting a coded pixel value signal Dg of a block located inside an object to an output terminal 1201b.

The information compression means 1200a includes a first padding unit (PAD1) 1203 for performing padding to the pixel data DEg of the difference block by replacing values of insignificant pixels (pixels located outside an object) of pixels in an image space formed by the pixel data DEg with prescribed padding values (for example, "0"), on the basis of the pixel value location information Hg from the pixel decision unit 1150, a DCT (Discrete Cosine Transform) unit 1204 for performing DCT to data Pg (pixel data of a padded block) output from the padding unit 1203, and a quantization unit 1205 for quantizing data Tg output from the DCT unit 1204, and outputting a quantization coefficient as pixel data Qg of a compressed difference block.

The DCT is performed for each of small blocks each consisting of 8×8 pixels into which one block consisting of 16×16 pixels is divided.

The pixel value coding apparatus 1200 further includes information expansion means 1200b for performing information expansion to data Qg output from the information compression means 1200a and outputting pixel data ITg of a expanded difference block, and an adder 2110 for adding the pixel data ITg to the pixel data Prg and outputting pixel data Rg of a regenerated block. The information expansion means 1200b includes an inverse quantization unit 1208 for inversely quantizing data Qg output from the information compression means 1200a, and an IDCT (inverse discrete cosine transform) unit 1209 for performing inverse DCT to data IQg output from the inverse quantization unit 1208 by converting data in a frequency region into data in a space region, and outputting pixel data ITg of an expanded difference block.

The prediction data generation section 1200c includes a frame memory (FM) 1213 for storing pixel data Rg of the regenerated block as reference image data for a subsequent frame to-be-processed, a second padding unit (PAD2) 1212 for performing padding to reference image data Mg for a frame which is being processed (current frame), on the basis of the pixel value location information Hg, a motion detection unit (ME) 1214 for obtaining a motion vector MV of a target block of the current frame, on the basis of the data PMG and the pixel data Bg, and outputting the motion vector MV, and a motion compensation unit (MC) 1215 for generating an address of the frame memory 1213 on the basis of the motion vector MV from the motion detection unit 1214 and the block location information Hb, extracting data in a memory area specified by the address from the padded data PMg, and outputting pixel data Prg of the prediction block.

Figure 20:
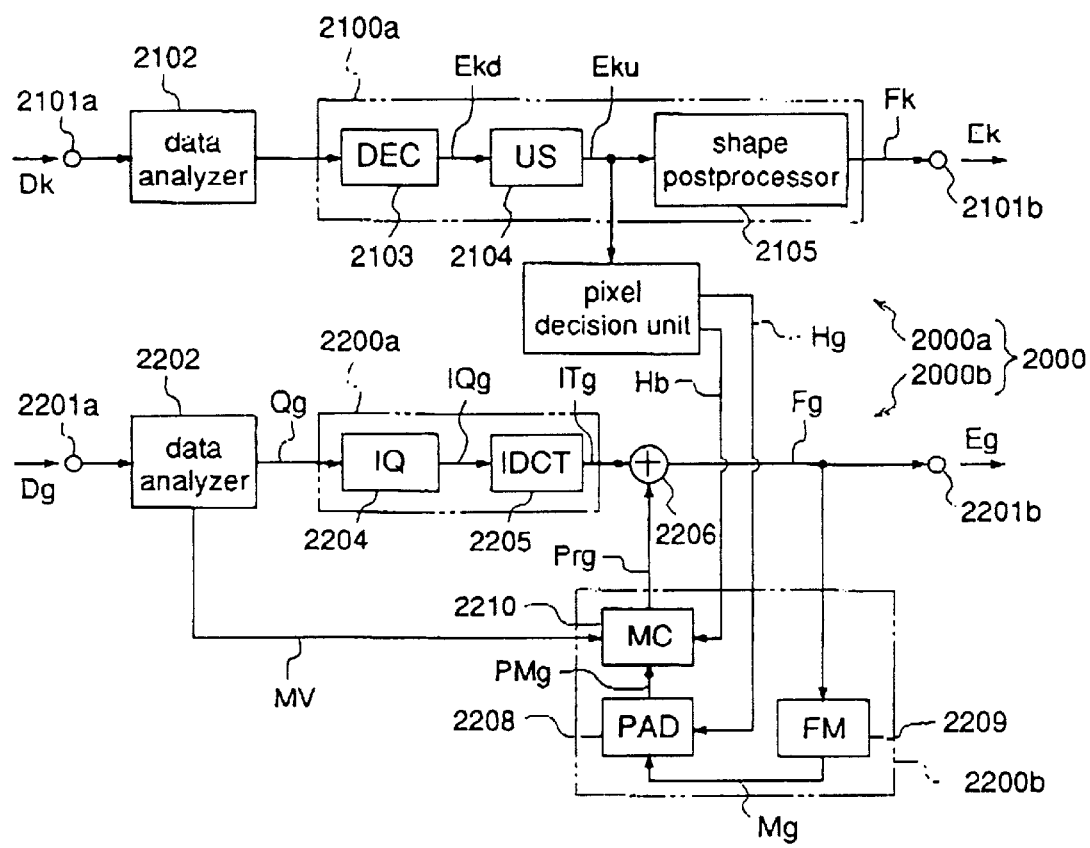
FIG. 20 is a block diagram showing a shape decoding apparatus for decoding a coded shape signal which has been coded by the shape coding apparatus of the seventh embodiment.

FIG. 20 shows an image processing apparatus 200 for decoding the digital image signal which has been coded by the image processing apparatus 1000 in FIG. 19.

Referring to FIG. 20, the shape processing apparatus 2000 includes a shape decoding apparatus 2000a for receiving the coded shape signal Dk output from the image processing apparatus 1000 at an input terminal 2101a, performing data analysis and arithmetic decoding to the signal Dk for each frame, and outputting a regenerated shape signal Fk to an output terminal 2101b, and a pixel value decoding apparatus 2000b for receiving the coded pixel value signal Dg output from the image processing apparatus 1000 at an input terminal 2201a, performing data analysis and information expansion to the signal Dg for each frame, and outputting a regenerated pixel image signal Rg to an output terminal 2201b.

The shape decoding apparatus 2000a includes a data analyzer 2102 for receiving the coded shape signal Dk of a block to-be-decoded (a target block) and performing analysis and variable length decoding to the signal Dk, a shape decoder (DEC) 2103 for performing shape decoding to a signal Ck from the data analyzer 2102 to generate a restored shape data Ekd, an upsampling unit (US) 2104 for upsampling the data Ekd in the ratio of downsampling thereof to generate expanded shape data Eku, and a shape postprocessor 2105 for performing shape post-processing to the data Eku and outputting the regenerated shape signal Fk to the output terminal 2101b. The shape decode 2103, the upsampling unit 2104, and the shape postprocessor 2105 constitute a shape decoding section 2100a.

The shape decoding apparatus 2000a further includes a pixel value decision unit 2150 for receiving the regenerated shape signal Fk output from the shape decoding section 2100a, and outputting block location information Hb indicating whether the target block is located inside or outside an object, and pixel value location information Hg indicating whether each pixel of the target block is located inside or outside an object.

The pixel value decoding apparatus 2000b includes a data analyzer 2202 for receiving a coded pixel value signal Dg of a block to-be-decoded (target block), and performing analysis and variable length decoding to the signal Dg, information expansion means 2200a for performing expansion to a signal Qg output from the data analyzer 2202, and outputting pixel data ITg of an expanded block of the current frame, and an adder 2206 for adding the pixel data ITg of an expanded difference block output from the information expansion means 2200a to pixel data Prg of a prediction block of the expanded difference block, and outputting a signal Rg as a regenerated pixel value signal.

The information expansion means 2200a comprises an inverse quantization unit (IQ) 2204 for inversely quantizing the signal Qg output from the data analyzer 2202, and an IDCT unit 2205 for performing IDCT (a type of inverse frequency transformation) to the signal IQg output from the inverse quantization means 2204, and outputting pixel data ITg of the expanded block.

The pixel value decoding apparatus 2000b further includes a prediction data generating section 2200b for receiving the pixel data Rg of the regenerated block output from the adder 2206, and generating pixel data Prg of the prediction block on the basis of the motion vector MV output from the data analyzer 2202, the pixel location information Hg and the block location information Hb output from the pixel decision unit 2150.

The prediction data generating section 2200b comprises a frame memory (FM) 2209 for storing the data Fg output from the adder 2206 as reference data, a padding unit (PAD) 2208 for performing padding to the data Mg output from the frame memory 2209 on the basis of the pixel location information Hg as in the case of the coding side, and a motion compensation unit (MC) 2210 for receiving data PMg output from the padding unit 2208, and generating the prediction data Prg on the basis of the motion vector MV and the block location information Hb.

Next, operation will be described.

Referring to FIG. 19 again, when the digital image signal is input to the image processing apparatus 1000, the shape signal Sk is coded for each frame in the shape coding apparatus 1100 (shape coding) and the pixel value signal Sg is coded for each frame in the pixel value coding apparatus 1200 (information compression and variable length coding).

More specifically, when the shape signal Sk is input to the input terminal 1101a, the signal Sk is divided by the blocking unit 1101 so that each of the divided signal Sk is included in each of plural blocks into which an object region including an object is divided, and output as shape data Bk of each block therefrom.

Then, the shape data Bk is input to the first to third coding sections 1100a~1100c, and compressed and expanded therein in different compression ratios.

For example, in the second shape coding section 1100b, the following operation takes place. The shape data Bk is downsampled in the ratio of 1/2, and converted into sampled shape data Skd2 by the second downsampling unit 1111b. The data Skd2 is shape coded and converted into compressed shape data Ck2 by the second shape encoder 1112b. The data Ck2 is shape decoded and converted into restored sampled data PEkd2 by the shape decoder 1113b. The data PEkd2 is upsampled in the ratio of 1/2 and converted into expanded shape data PEku2 by the second upsampling unit 1114b. The data PEku2 is processed by the second shape postprocessor 1115b, and output as shape post-processed data PFku2 therefrom.

The above expansion and compression is also performed in the first and third coding sections 1100a and 1100c in the same manner except the following respects.

In the first coding section 1100a, the data Bk is downsampled in the ratio of 1/1 by the first downsampling unit 1111a. In other words, practically, the data Bk is not downsampled and directly output. Also, the restored shape data PEkd1 is upsampled in the ratio of 1/1 by the first upsampling unit 1114a. In other words, practically, the data PEkd1 is not upsampled and directly output. In the third coding section 1100c, the data Bk is downsampled in the ratio of 1/4 by the downsampling unit 1111c. Also, the restored shape data PEkd3 is upsampled in the ratio of 1/4 by the third upsampling unit 1114c. The other components of the first and third shape coding sections 1100a and 1100c operate as in the case of those of the second coding section 1100b.

The analyzer 1120 compares the shape data Bk of the target block to output data (shape post-processed data) PFku1~PFku3 from the first to third shape coding section 1100a~1100c, deciding which of the data PFku1~PFku3 correspond to shape post-processed data in which block location information included in the shape data Bk indicating whether the target block is located inside or outside an object is held, and supplies the select switch 1130 with the select control signal SWc2 as a decision signal.

The select switch 1130 selects one of the compressed shape data Ck1~Ck3 output from the corresponding encoders 1112a~1112c for each block in accordance with the control signal SWc2. Specifically, the switch 1130 selects compressed shape data output from a shape coding section with the highest compression ratio which generates shape post-processed data by forming a locally regenerated block located outside an object when a target block is located outside the object, and forming a locally regenerated block located inside an object when a target block is located inside the object.

The compressed shape data SCk selected by the select switch 1130 is variable length coded by the variable length encoder 1140, and output to the output terminal 1101b as the coded shape signal (shape bit stream) Dk. A downsampling ratio of shape data of each block is sent to the decoding side as a flag indicating side information of each block together with the coded shape signal Dk of each block.

Meanwhile, the shape data Bk is input to the pixel decision unit 1150, which outputs the block location information Hb indicating whether the target block is located outside the object, and the pixel location information Hg indicating whether each pixel of the target block is located outside the object.

In the pixel value coding apparatus 1200, the pixel value signal Sg is input to the input terminal 1201a, and then divided by the blocking unit 1201 so that each of the divided pixel value signal Sg is included in each of the plural blocks, and output as the pixel data Bg of each block.

The pixel data Bg is input to the motion detection unit 1214. Pixel data Mg of a past regenerated image (reference image) stored in the frame memory 1213 is read therefrom to the second padding unit 1212, and padded therein on the basis of the pixel location information Hg. Pixel data PMg of the padded reference image is input to the motion detection unit 1214, which outputs a motion vector MV, i.e., motion displacement information for giving a prediction block including pixel data which has the smallest error with respect to the pixel data Bg on the basis of the pixel data PMg by block matching or the like.

The motion vector MV is input to the motion compensation unit 1215, which generates pixel data Prg of the prediction block from the pixel data PMg on the basis of the block location information Hb. At this time, the motion vector MV is sent to the variable length encoder (VLC) 1211, which performs variable length coding to the motion vector MV, and then outputs a coded motion vector to the output terminal 1201b.

The pixel data Bg and the pixel data Prg are input to the subtracter 1202, which performs operation, thereby obtaining difference data between them as pixel data DEg of a difference block.

The pixel data DEg is subjected to information compression. Specifically, the pixel data DEg is padded by the first padding unit 1203 on the basis of the pixel value location information Hg, and the resulting padded pixel value data Pg is converted into frequency component Tg by the DCT unit 1204. The frequency component Tg is quantized and converted into a quantization coefficient Qg by the quantization unit 1205, and output as pixel data Qg of a compressed block. The pixel data Qg is variable length coded by the variable length encoder 1211, and output as the coded image signal Dg from the output terminal 1201b together with coded data of the other side information including the motion vector.

The pixel data Qg is also subjected to information expansion in the information expansion means 1200b. Specifically, the pixel data Qg is inversely quantized and converted into frequency component IQg by the inverse quantization unit 1208. The frequency component IQg is restored to the data ITg in a space region by the IDCT unit 1209. The data ITg is a restored signal (pixel data of an expanded block) of the pixel data Dg of the padded difference block. The pixel data ITg is added to the pixel data Prg of the prediction block by the adder 2110, and the resulting pixel data Rg of the regenerated block in input to the frame memory 1213.

The coded shape signal Dk and the coded pixel value signal Dg output from the image processing apparatus 1000 are respectively input to the image processing apparatus 2000 in FIG. 20, where the shape decoding apparatus 2000a decodes the signal Dk by performing data analysis and shape decoding thereto for each frame, while the pixel value decoding apparatus 2000b decodes the signal Dg by performing data analysis and information expansion thereto for each frame.

This operation will be described below.

When the signal Dk is input to the input terminal 2101a of the decoding apparatus 2000a, the signal Dk is analyzed and variable length decoded by the data analyzer 2102, and restored to compressed shape data Ck, which is shape decoded by the shape decoder 2103 to generate restored shape data Ekd, which is upsampled in the ratio of downsampling of this data by the upsampling unit 2104. Since the compression ratio of shape data of each block has been sent for each block as side information from the shape coding apparatus 1100, the upsampling unit 2104 upsamples the restored shape data Ekd of each block on the basis of the side information while changing the compression ratio suitably.

Expanded shape data Eku is output from the upsampling unit 2104, shape post-processed by the shape post processor 2105, and then output to the terminal 2101b as a regenerated shape signal Fk.

Meanwhile, the coded pixel value signal Dg input to the input terminal 2201a, is analyzed by the data analyzer 2202, which generates pixel data Qg of the compressed difference block and the motion vector MV in the pixel value coding apparatus in FIG. 19. The pixel data Qg is output to the information expansion means 2200a, while the motion vector MV is output to the motion compensation unit 2210.

In the information expansion means 2200a, information expansion is performed to the pixel data Qg, and the pixel data IQg of the padded difference block in the pixel value coding apparatus 1200 is restored to the pixel data ITg of the expanded difference block. More specifically, the pixel data Qg is inversely quantized and converted into pixel data IQg in a frequency region by the inverse quantization unit 2204. The pixel data IQg is converted into pixel data in a space region by the IDCT unit 2205, and output as the pixel data ITg of the expanded difference block.

The motion compensation unit 2210 generates an address for accessing the frame memory 2209 on the basis of the motion vector MV from the data analyzer 2202. On the basis of the address, the data MG stored in the frame memory 2209 as reference data for the current frame is read to the padding unit 2208, which outputs padded data PMg to the motion compensation unit 2210, which generates pixel data Prg of the prediction block from the data PMg. The adder 2206 adds the pixel data Prg to the pixel data ITg, and outputs pixel data Fg to the output terminal 2201b as a regenerated pixel value signal.

Thus, in accordance with the seventh embodiment, the first to third shape coding sections (compression and expansion means) with different compression ratios are provided for compressing shape signal of a block to-be-coded in a prescribed compression ratio to generate compressed data, and expanding the compressed shape data, locally decoded shape signals PFku1~Pfku3 output from the respective shape coding sections are analyzed, thereby specifying a shape coding section with the highest compression ratio which outputs a locally decoded shape signal in which information included in the shape data Bk of the target block, indicating whether a target block is located outside or inside an object, is held, and compressed data SCk output from the specified shape coding section is coded and output as a coded shape signal Dk. Therefore, were a block-to-be-coded is located inside an object, the corresponding block to-be-decoded is located inside an object, while a block-to-be-coded is located outside an object, the corresponding block to-be-decoded is located outside an object. Thereby, in a decoding side, motion compensation is performed to coded data of all target blocks using a motion vector, whereby preferable decoding is carried out. As a result, in case of shape post-processing for reducing visual distortion resulting from coding a shape signal, significant degradation of an image quality of a regenerated image is avoided.

For instance, in a case where coding of a shape signal is performed concurrently with coding of a pixel value signal, it is possible to avoid an event where a block (image space) located outside an object including an object shape signal becomes a block located inside an object including a locally decoded shape signal due to distortion of shape coding, whereby significant degradation of an image quality resulting from lack of motion vector detection or pixel value compression is avoided.

In addition, in a coding method according to MPEG which has adopted high-level motion compensation (overlap motion compensation) in which an operation method varies depending upon whether a neighboring block is a transparent or non-transparent block, it is possible to avoid an event where a block (image space) located outside an object including an object shape signal becomes a block located inside an object including a locally decoded shape signal due to distortion of shape coding. Thereby, it is possible to avoid degradation of an image quality of a regenerated image resulting from incorrect operation in the overlap motion compensation.

While in the seventh embodiment, selection of a shape coding section is performed among plural sections with different compression ratios so that a target block located outside an object becomes a locally decoded block located outside an object and a target block located inside an object becomes a locally decoded block located inside an object, the selection may be performed so that a target block located outside an object becomes a locally decoded block located outside an object or a target block located inside an object becomes a locally decoded block located inside an object.

Further, a coding or decoding program which implements construction of the shape coding apparatus or shape decoding apparatus of each embodiment is recorded in a data recording medium such as a floppy disc, whereby the coding or decoding is carried out in an independent computer with ease. This is described below.

FIGS. 11(a)–11(c) are diagrams showing a case in which the coding or decoding in each of the first to sixth embodiments is carried out in a computer system using a floppy disc in which the coding or decoding program is stored.

FIG. 11(a) shows a physical format of a floppy disc FD as a recording medium body, and FIG. 11(b) shows a front appearance and a cross-section of the floppy disc FD, and the floppy disc FD. Referring to FIGS. 11(a) and 11(b), the floppy disc FD is stored in a case F and in a surface thereof, plural tracks Trs are formed concentrically from outer to inner radius thereof, each track being divided into 16 sectors Se in an angle direction. Data of the program is recorded in allocated regions on the floppy disc FD.

FIG. 11(c) is a diagram showing a construction with which the program is recorded/regenerated in/from the floppy disc FD. In case of recording the program in the floppy disc FD, data of the program is written thereto through a floppy disc drive FDD from a computer systems Cs. In another case of constructing the coding or decoding apparatus in the computer system Cs using the program in the floppy disc FD, the program is read from the floppy disc FD by means of the floppy disc drive FDD and transferred to the computer system Cs.

Although the floppy disc is used as the data recording medium herein, an optical disc may be used. In addition, the data recording medium is not limited to these, and an IC card, an ROM cassette, or the like may be used to implement the coding or decoding so long as it can record a program.

What is claimed is:

1. A shape coding method of coding an object shape signal indicating a prescribed object shape in an image display signal, said method comprising:

coding the object shape signal for each unit region of a prescribed size on a display screen to generate a coded shape bit stream, and decoding a signal which is in the middle of the coding to generate a locally decoded shape signal;

analyzing the locally decoded shape signal for each unit region, and deciding at least one of a type of shape post-processing of the locally decoded shape signal for making an object shape obtained from the locally decoded shape signal smooth and whether to perform the shape post-processing to the locally decoded shape signal, in accordance with an analysis result; and outputting one of the locally decoded shape signal to which prescribed shape post-processing has been performed and the locally decoded shape signal to which the shape post-processing has not been performed, as a coding shape signal for use in coding a signal other than the object shape signal in the image display signal.

2. The shape coding method as defined in claim 1 wherein, the decision on the shape post-processing in accordance with the analysis result is, when a locally decoded shape signal of a unit region indicates that the unit region is located outside an object, performed so that the locally decoded shape signal to which the shape post processing has been performed indicates that the unit region is located outside the object.

3. The shape coding method as defined in claim 2 wherein in the shape post-processing, the locally decoded shape signal is changed using a filter of a prescribed characteristic so that the object shape obtained from the locally decoded shape signal becomes smooth.

4. A shape coding method of coding an object shape signal indicating a prescribed object shape in an image display signal, said method comprising:

downsampling the object shape signal to generate a downsampled shape signal in which pixels to-be-coded have been reduced;

coding the downsampled shape signal for each unit region of a prescribed size on a display screen to generate a coded shape bit stream, and decoding a signal which is in the middle of the coding to generate a locally decoded shape signal;

upsampling the locally decoded shape signal to generate an upsampled shape signal in which pixels have been increased;

analyzing the upsampled shape signal for each unit region, and deciding at least one of a type of shape post-processing of the upsampled shape signal for making an object shape obtained from the upsampled shape signal smooth and whether to perform the shape post-processing to the upsampled shape signal, in accordance with an analysis result; and outputting one of the upsampled shape signal to which prescribed shape post-processing has been performed and the upsampled shape signal to which the shape post-processing has not been performed, as a coding shape signal for use in coding a signal other than the object shape signal in the image display signal.

5. A shape decoding method of decoding a coded shape bit stream of a prescribed object shape in an image display signal to generate a decoded object shape signal of the object shape, said method comprising:

decoding the coded shape bit stream for each unit region of a prescribed size on a display screen to generate a decoded shape signal;

analyzing the decoded shape signal for each unit region, and deciding at least one of a type of shape post-processing of the decoded shape signal for making an object shape obtained from the decoded shape signal smooth and whether to perform the shape post-processing to the decoded shape signal, in accordance with an analysis result; and outputting one of the decoded shape signal to which prescribed shape post-processing has been performed and the decoded shape signal to which the shape post-processing has not been performed, as a decoding object shape signal for use in decoding a signal other than the object shape signal in the image display signal.

6. The shape decoding method as defined in claim 5 wherein the decision on the shape post-processing in accordance with the analysis result is, when a decoded shape signal of a unit region indicates that the unit region is located outside an object, performed so that the decoded shape signal to which the shape post-processing has been performed indicates the unit region is located outside the object.

7. The shape decoding method as defined in claim 6 wherein in the shape post-processing, the decoded shape signal is changed using a filter of a prescribed characteristic so that the object shape obtained from the decoded shape signal becomes smooth.

8. A shape decoding method of decoding a coded shape bit stream of a prescribed object shape in an image display signal to generate a decoded object shape signal of the object shape, said method comprising:

decoding the coded shape bit stream for each unit region of a prescribed size on a display screen to generate a decoded shape signal;

upsampling the decoded shape signal to generate an upsampled shape signal in which pixels have been increased;

analyzing the upsampled shape signal for each unit region, and deciding at least one of a type of shape post-processing of the upsampled shape signal for making an object shape obtained from the upsampled shape signal smooth and whether to perform the shape post-processing to the upsampled shape signal, in accordance with an analysis result; and outputting one of the upsampled shape signal to which prescribed shape post-processing has been performed and the upsampled shape signal to which the shape post-processing has not been performed, as a decoding object shape signal for use in decoding a signal other than the object shape signal in the image display signal.

9. A shape coding apparatus for coding an object shape signal indicating a prescribed object shape in an image display signal, said apparatus comprising:

shape coding means for coding the object shape signal for each unit region of a prescribed size on a display screen to generate a coded shape bit stream, and decoding a signal which is in the middle of the coding to generate a locally decoded shape signal;

shape analyzing means for analyzing the locally decoded shape signal for each unit region, and deciding at least one of a type of shape post-processing of the locally decoded shape signal for making an object shape obtained from the locally decoded shape signal smooth and whether to perform the shape post-processing to the locally decoded shape signal, in accordance with an analysis result;

shape post-processing means for performing prescribed shape post-processing to the locally decoded shape signal on the basis of an output of the shape analyzing means; and signal selecting means for selecting one of the locally decoded shape signal from the shape coding means and the locally decoded shape signal to which shape post-processing has been performed from the shape post-processing means, on the basis of the output of the shape analyzing means wherein;

an output of the signal selecting means serves as a coding shape signal for use in coding a signal other than the object shape signal in the image display signal.

10. A shape coding apparatus for coding an object shape signal indicating a prescribed object shape in an image display signal, said apparatus comprising:

downsampling means for downsampling the object shape signal to generate a downsampled shape signal in which pixels to-be-coded have been reduced;

shape coding means for coding the downsampled shape signal for each unit region of a prescribed size on a display screen to generate a coded shape bit stream, and decoding a signal which is in the middle of the coding to generate a locally decoded shape signal;

upsampling means for upsampling the locally decoded shape signal to generate an upsampled shape signal in which pixels have been increased;

shape analyzing means for analyzing the upsampled shape signal for each unit region, and deciding at least one of a type of shape post-processing of the upsampled shape signal for making an object shape obtained from the upsampled shape signal smooth and whether to perform the shape post-processing to the upsampled shape signal, in accordance with an analysis result;

shape post-processing means for performing prescribed shape post-processing to the upsampled shape signal on the basis the analysis result; and signal selecting means for selecting one of the upsampled shape signal from the upsampling means and the upsampled shape signal to which shape post-processing has been performed from the shape post-processing means, on the basis of the analysis result, an output of the signal selecting means serving as a coding shape signal for use in coding a signal other than the object shape signal in the image display signal.

11. A shape decoding apparatus for decoding a coded shape bit stream of a prescribed object shape in an image display signal to generate a decoded object shape signal of the object shape, said apparatus comprising:

shape decoding means for decoding the coded shape bit stream for each unit region of a prescribed size on a display screen to generate a decoded shape signal;

shape analyzing means for analyzing the decoded shape signal for each unit region, and deciding at least one of a type of shape post-processing of the decoded shape signal for making an object shape obtained from the decoded shape signal smooth and whether to perform the shape post-processing to the decoded shape signal, in accordance with an analysis result;

shape post-processing means for performing prescribed shape post-processing to the decoded shape signal on the basis of the analysis result; and signal selecting means for selecting one of the decoded shape signal from the shape decoding means and the decoded shape signal to which shape post-processing has been performed from the shape post-processing means, on the basis of the analysis result, an output of the signal selecting means serving as a decoding object shape signal for use in decoding a signal other than the object shape signal in the display shape signal.

12. A shape decoding apparatus for decoding a coded shape bit stream of a prescribed object shape in an image display signal to generate a decoded object shape signal of the object shape, said apparatus comprising:

shape decoding means for decoding the coded shape bit stream for each unit region of a prescribed size on a display screen to generate a decoded shape signal;

upsampling means for upsampling the decoded shape signal to generate an upsampled shape signal in which pixels have been increased;

shape analyzing means for analyzing the upsampled shape signal for each unit region, and deciding at least one of a type of shape post-processing of the upsampled shape signal for making an object shape obtained from the upsampled shape signal smooth and whether to perform the shape post-processing to the upsampled shape signal, in accordance with an analysis result;

shape post-processing means for performing prescribed shape post-processing to the upsampled shape signal on the basis of the analysis result; and signal selecting means for selecting one of the upsampled shape signal from the upsampling means and the upsampled shape signal to which shape post-processing has been performed from the shape post-processing means, on the basis of the analysis result, an output of the signal selecting means serving as a decoding object shape signal for use in decoding a signal other than the object shape signal in the image display signal.

13. A data recording medium in which a program for performing the shape coding method of claim 1 by a computer is stored; said program making the computer perform the following steps:

coding the object shape signal for each unit region of a prescribed size on a display screen to generate a coded shape bit stream, and decoding a signal which is in the middle of the coding to generate a locally decoded shape signal;

analyzing the locally decoded shape signal for each unit region, and deciding at least one of a type of shape post-processing of the locally decoded shape signal for making an object shape obtained from the locally decoded shape signal smooth and whether to perform the shape post-processing to the locally decoded shape signal, in accordance with an analysis result; and outputting one of the locally decoded shape signal to which prescribed shape post-processing has been performed and the locally decoded shape signal to which the shape post-processing has not been performed, as a coding shape signal for use in coding a signal other than the object shape signal in the image display signal.

14. A data recording medium in which a program for performing the shape decoding method of claim 5 by a computer is stored, said program making the computer perform the following steps:

decoding the coded shape bit stream for each unit region of a prescribed size on a display screen to generate a decoded shape signal;

analyzing the decoded shape signal for each unit region, and deciding at least one of a type of shape post-processing of the decoded shape signal for making an object shape obtained from the decoded shape signal smooth and whether to perform the shape post-processing to the decoded shape signal, in accordance with an analysis result; and outputting one of the decoded shape signal to which prescribed shape post-processing has been performed and the decoded shape signal to which the shape post-processing has not been performed, as a decoding object shape signal for use in decoding a signal other than the object shape signal in the image display signal.

15. A shape coding method in which an object shape signal indicating a shape of an object which is included in an image display signal forming an image space including an object having an arbitrary shape is input and the input object shape signal is coded for each of unit regions of a prescribed size into which the image space is divided into, said method comprising:

performing plural types of compression and expansion with different compression ratios wherein an object shape signal in a unit region to be coded is compressed in a prescribed ratio to generate a compressed shape signal, and the compressed shape signal is expanded correspondingly to the compression to generate a locally decoded shape signal;

analyzing locally decoded shape signals resulting from the compression and expansion with different compression ratios, thereby selecting compression and expansion with the highest compression ratio in which information included in the input object shape signal, indicating that the unit region to be coded is located outside the object is held in the locally decoded shape signal, among the plural type of compression and expansion; and coding a compressed shape signal resulting from the selected compression and expansion and outputting a coded shape signal.

16. The shape coding method of claim 15 wherein in each of the plural types of compression and expansion with different compression ratios, compression includes downsampling the object shape signal in a prescribed downsampling ratio, expansion includes upsampling the compressed shape signal correspondingly to the downsampling, and in the one selected compression and expansion, information included in the input object shape signal, indicating that the unit region to be coded is located outside the object is held in the locally decoded shape signal, regardless of coding distortion resulting from the downsampling and upsampling.

17. A shape coding method in which an object shape signal indicating a shape of an object which is included in an image display signal forming an image space including an object having an arbitrary shape is input and the input object shape signal is coded for each of unit regions of a prescribed size into which the image space is divided into, said method comprising:

performing plural types of compression and expansion with different compression ratios wherein an object shape signal in a unit region to be coded is compressed in a prescribed ratio to generate a compressed shape signal, and the compressed shape signal is expanded correspondingly to the compression to generate a locally decoded shape signal;

analyzing locally decoded shape signals resulting from the compression and expansion with different compression ratios, thereby selecting compression and expansion with the highest compression ratio in which information included in the input object shape signal, indicating that the unit region to be coded is not located outside the object is held in the locally decoded shape signal, among the plural types of compression and expansion; and coding a compressed shape signal resulting from the selected compression and expansion and outputting a coded shape signal.

18. The shape coding method of claim 17 wherein in each of the plural types of compression and expansion with different compression ratios, compression includes downsampling the object shape signal in a prescribed downsampling ratio, expansion includes upsampling the compressed shape signal correspondingly to the downsampling, and in the one selected compression and expansion, information included in the input shape signal, indicating that the unit region to be coded is not located outside the object is held in the locally decoded shape signal, regardless of coding distortion resulting from the downsampling and upsampling.

19. A shape coding apparatus for receiving an object shape signal indicating a shape of an object which is included in an image display signal forming an image space including an object having arbitrary shape as an input and coding the object shape signal for each of unit regions of a prescribed size into which the image space is divided into, said apparatus comprising:

plural compression and expansion means for performing plural types of compression and expansion with different compression ratios wherein an object shape signal in a unit region to be coded is compressed in a prescribed ratio to generate a compressed shape signal, and the compressed shape signal is expanded correspondingly to the compression to generate a locally decoded shape signal;

analyzing means for analyzing locally decoded shape signals output from the respective compression and expansion means with different compression ratios, thereby specifying compression and expansion means for performing compression and expansion with the highest ratio in which information included in the input object shape signal, indicating that the unit region to be coded is located outside the object is held in the locally decoded shape signal;

signal selecting means for receiving an output of the analyzing means and selecting a compressed shape signal as an output of the compression and expansion means specified by the analyzing means among outputs of the plural compression and expansion means; and coding means for coding the compressed shape signal output from the compression and expansion means selected by the signal selecting means and outputting a coded shape signal.

20. The shape coding apparatus of claim 19 wherein the compression and expansion means performs downsampling to the object shape signal in a prescribed downsampling ratio as a part of the compression, and performs upsampling to the compressed shape signal correspondingly to the downsampling as a part of the expansion, and the analyzing means specifies compression and expansion means for performing compression and expansion in which information included in the input object shape signal, indicating that the unit region to be coded is located outside the object, is held in the locally decoded shape signal, regardless of coding distortion resulting from the downsampling and upsampling.

21. A shape coding apparatus for receiving an object shape signal indicating a shape of an object which is included in an image display signal forming an image space including an object having an arbitrary shape as an input and coding the object shape signal for each of unit regions of a prescribed size into which the image space is divided into, said apparatus comprising:

plural compression and expansion means for performing plural types of compression and expansion with different compression ratios wherein an object shape signal in a unit region to be coded is compressed in a prescribed ratio to generate a compressed shape signal, and the compressed shape signal is expanded correspondingly to the compression to generate a locally decoded shape signal;

analyzing means for analyzing locally decoded shape signals output from the respective compression and expansion means with different compression ratios, thereby specifying compression and expansion means for performing compression and expansion with the highest ratio in which information included in the input object shape signal, indicating that the unit region to be coded is not located outside the object is held in the locally decoded shape signal;

signal selecting means for receiving an output of the analyzing means and selecting a compressed shape signal as an output of the compression and expansion means specified by the analyzing means among outputs of the plural compression and expansion means; and coding means for coding the compressed shape signal from the compression and expansion means selected by the signal selecting means and outputting a coded shape signal.

22. The shape coding apparatus of claim 21 wherein the compression and expansion means performs downsampling to the object shape signal in a prescribed downsampling ratio as a part of the compression, and performs upsampling to the compressed shape signal correspondingly to the downsampling as a part of the expansion, and the analyzing means specifies compression and expansion means for performing compression and expansion in which information included in the input shape signal, indicating that the unit region to be coded is not located outside the object is held in the locally decoded shape signal, regardless of coding distortion resulting from the downsampling and upsampling.

23. A data recording medium for storing a program executed by a computer, which performs shape coding method in which an object shape signal indicating a shape of an object which is included in an image display signal forming an image space including an object having an arbitrary shape is input and the input object shape signal is coded for each of unit regions of a prescribed size into which the image space is divided into, said program making the computer perform the following steps:

a first step for performing plural types of compression and expansion with different compression ratios wherein an object shape signal in a unit region to be coded is compressed in a prescribed ratio to generate a compressed shape signal, and the compressed shape signal is expanded correspondingly to the compression to generate a locally decoded shape signal;

a second step for analyzing locally decoded shape signals resulting from the respective compression and expansion with different compression ratios, thereby selecting compression and expansion with the highest compression ratio in which information included in the input object shape signal, indicating that the unit region to be coded is located outside the object, is held in the locally decoded shape signal, among the plural types of compression and expansion; and a third step for coding a compressed shape signal resulting from the selected compression and expansion and outputting a coded shape signal.

24. A data recording medium for storing a program executed by a computer, which performs shape coding method in which an object shape signal indicating a shape of an object which is included in an image display signal forming an image space including an object having an arbitrary shape is input and the input object shape signal is coded for each of unit regions of a prescribed size into which the image space is divided into, said program making the computer perform the following steps:

a first step for performing plural types of compression and expansion with different compression ratios wherein an object shape signal in a unit region to be coded is compressed in a prescribed ratio to generate a compressed shape signal, and the compressed shape signal is expanded correspondingly to the compression to generate a locally decoded shape signal;

a second step for analyzing locally decoded shape signals resulting from the respective compression and expansion with different compression ratios, thereby selecting compression and expansion with the highest compression ratio in which information included in the input object shape signal, indicating that the unit region to be coded is not located outside the object is held in the locally decoded shape signal, among the plural types of compression and expansion; and a third step for coding a compressed shape signal resulting from the selected compression and expansion and outputting a coded shape signal.

* * * * *